US 8,498,999 B1

(12) United States Patent
Bhalotia

(10) Patent No.: US 8,498,999 B1
(45) Date of Patent: Jul. 30, 2013

(54) TOPIC RELEVANT ABBREVIATIONS

(75) Inventor: Gaurav Bhalotia, Mountain View, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 11/580,522

(22) Filed: Oct. 13, 2006

Related U.S. Application Data

(60) Provisional application No. 60/727,068, filed on Oct. 14, 2005.

(51) Int. Cl.
*G06F 17/21* (2006.01)
*G06F 17/30* (2006.01)

(52) U.S. Cl.
USPC .......................................... 707/767; 707/771

(58) Field of Classification Search
USPC ............................ 707/E17.074, 765, 767, 771
See application file for complete search history.

(56) References Cited

U.S. PATENT DOCUMENTS

| | | | | |
|---|---|---|---|---|
| 5,404,507 A * | 4/1995 | Bohm et al. | | 707/4 |
| 5,623,406 A * | 4/1997 | Ichbiah | | 704/3 |
| 5,634,084 A * | 5/1997 | Malsheen et al. | | 704/260 |
| 5,839,107 A * | 11/1998 | Gupta et al. | | 704/270 |
| 6,611,825 B1 * | 8/2003 | Billheimer et al. | | 706/45 |
| 6,934,767 B1 * | 8/2005 | Jellinek | | 709/247 |
| 6,999,932 B1 * | 2/2006 | Zhou | | 704/277 |
| 7,028,038 B1 * | 4/2006 | Pakhomov | | 707/100 |
| 7,236,923 B1 * | 6/2007 | Gupta | | 704/9 |
| 7,346,490 B2 * | 3/2008 | Fass et al. | | 704/7 |
| 2001/0029455 A1 * | 10/2001 | Chin et al. | | 704/277 |
| 2002/0156760 A1 * | 10/2002 | Lawrence et al. | | 707/1 |
| 2003/0014399 A1 * | 1/2003 | Hansen et al. | | 707/3 |
| 2004/0139072 A1 * | 7/2004 | Broder et al. | | 707/4 |
| 2005/0065917 A1 * | 3/2005 | Anick et al. | | 707/3 |
| 2005/0091197 A1 * | 4/2005 | Dettinger et al. | | 707/3 |
| 2005/0144162 A1 | 6/2005 | Liang | | |
| 2005/0267871 A1 * | 12/2005 | Marchisio et al. | | 707/3 |
| 2006/0116862 A1 * | 6/2006 | Carrier et al. | | 704/1 |

OTHER PUBLICATIONS

Dialog Technical Documentation, Dec. 10, 2002.*
A method of improving search precision based on documents selected by user, IBM, Oct. 19, 2004.*
Automatic expansion of abbreviations by using context and character information, Terada et. al., 2004.*
Pinball Abbreviation Database, May 3, 2004.*
Larkey, Acrophile: An Automated Acronym Extractor and Server, 2000, pp. 205-214.*
Xu, Maching Learning Approach to Recognizing Acronyms and Their Expansion, Proceedings of the Fourth International Conference on Machine Learning and Cybernetics, Guangzhou, Aug. 18-21, 2005, pp. 2313-2319.*
Borodin et al., Finding Authorities and Hubs From Link Structures on the World Wide Web, In Proceedings of the Tenth International World Wide Web Conference, Jan. 18, 2002.

(Continued)

*Primary Examiner* — Albert Phillips, III
(74) *Attorney, Agent, or Firm* — David R. Stevens; Stevens Law Group

(57) ABSTRACT

Delivering a search result is disclosed. A query is received. A term in the query that is a first portion of an abbreviation pair is identified. A second portion of the abbreviation pair is determined. A search result for the query is determined based at least in part on the second portion of the abbreviation pair and the search result is returned.

18 Claims, 28 Drawing Sheets

OTHER PUBLICATIONS

Taher H. Haveliwala, Topic-Sensitive PageRank: A Context-Sensitive Ranking Algorithm for Web Search, In Proceedings of the Eleventh International World Wide Web Conference, 2002.

Jeh et al., Scaling Personalized Web Search, In Proceedings of the Twelfth International World Wide Web Conference, 2003.

Jon M. Kleinberg, Authoritative Sources in a Hyperlinked Environment, Journal of the ACM, 1999.

Lempel et al., The Stochastic Approach for Link-Structure Analysis (SALSA) and the TKC Effect, 2000.

Ng et al., Stable Algorithms for Link Analysis, In Proceedings the Twenty-Fourth Annual International ACM SIGIR Conference, 2001.

Page et al., The PageRank Citation Ranking: Bringing Order to the Web, 1998.

Richardson et al., The Intelligent Surfer: Probabilistic Combination of Link and Content Information in PageRank, 2002.

Soumen Chakrabarti, Mining the Web: Discovering Knowledge from Hypertext Data, 2002.

\* cited by examiner

|  | Original Random Walk | Dual Random Walk |
|---|---|---|
| Links | Inlinks, Outlinks | Invert the link direction |
| Outbound Link Probability | Uniformly Distributed | Proportional to Effective Page Rank (in original Web Graph) of destination: (Page Rank/ # Outlinks) |
| Outbound Teleportation | Uniform for all Pages $(1-\beta)$ | Inversely proportional to Page Rank |
| Inbound Teleportation | Uniform $(1/N)$ | Proportional to Page Rank |
| Page Rank | $P(k)$ | $P(k)$ |

FIG. 18

TOPIC RELEVANT ABBREVIATIONS

CROSS REFERENCE TO OTHER APPLICATIONS

This application claims priority to U.S. Provisional Patent Application No. 60/727,068 entitled TOPIC RELEVANT ABBREVATIONS filed Oct. 14, 2005 which is incorporated herein by reference for all purposes.

BACKGROUND OF THE INVENTION

It may sometimes be desirable to search a corpus, such as the World Wide Web or a subset of the Web using an abbreviation or acronym. For example, a user may not know the expansion of a term, may not remember the correct spelling of one or more words included in the expansion, or may wish to save time by using a shortened form of an expression.

Unfortunately, abbreviations often map to multiple expansions and a degree of ambiguity may thus result when an abbreviation is employed (e.g., in a query). There thus exists a continuing need to be able to provide relevant results in response to queries.

BRIEF DESCRIPTION OF THE DRAWINGS

Various embodiments of the invention are disclosed in the following detailed description and the accompanying drawings.

FIG. 18 is a table illustrating properties of walks.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
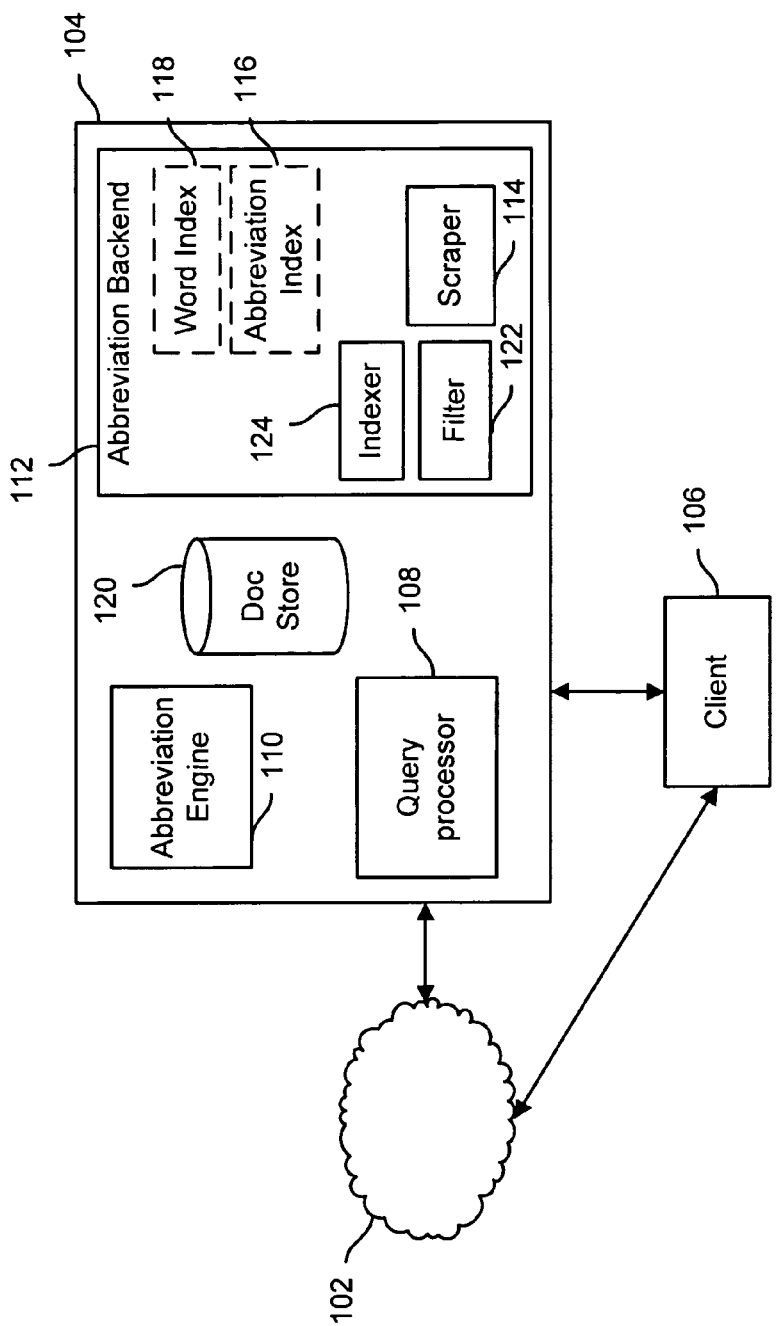
FIG. 1 illustrates an embodiment of a search system.

FIG. 1 illustrates an embodiment of a search system. In the example shown, a query processor 108, an abbreviation engine 110, an abbreviation backend 112, a scraper 114, an abbreviation index 116, a word index 118, a document store 120, a filter 122, and an abbreviation indexer 124 are included.

Collection 102 (also referred to herein as a corpus) is a group of World Wide Web pages, and is crawled and indexed by search system 104. As described more fully below, in some embodiments search system 104 assigns scores to at least a portion of the documents in collection 102 based on techniques such as DIFR and/or Topic Relevance.

Client 106 submits queries to search system 104. Received queries are processed by query processor 108, and appropriate results from collection 102 are returned to client 106. Hereinafter, when an operation is discussed as being performed on each document in collection 102, it should be understood that the operation may instead be performed on a subset of collection 102, as applicable. The documents in collection 102 are also referred to herein as "web nodes" and "web pages." In some embodiments, collection 102 includes documents found on an intranet. In some embodiments, collection 102 is a subset of the World Wide Web, or a subset of the documents found on an intranet, or a combination of such subsets. Documents found in collection 102 can include, but are not limited to text files, multimedia files, and other content.

Queries (made up of one or more "terms") submitted by client 106 may include one or more abbreviations. As used herein, an "abbreviation" includes any short form of a term, and may take a variety of forms, such as an acronym, initialism, apocopation, clipping, elision, syncope, portmanteau, etc. A search "term" can include a single word or letter, a string of words, or an expression (e.g., including a number or other symbol). In some cases, a short form of a term may be the shortening or omission of some of the words in the long form of the term, such as "Cal. Bar" (corresponding to the more formal "State Bar of California").

As described in more detail below, abbreviation engine 110 determines whether queries contain abbreviations by making use of information provided by abbreviation backend 112. Scraper 114 evaluates the contents of document store 120 (e.g., comprising the results of a crawl of collection 102) for candidate short form/long form pairs and obtains scores associated with those pairs. Filter 122 consolidates the information obtained by scraper 114 and filters it, e.g., to remove inaccurate pairs or pairs corresponding with foreign languages. Abbreviation indexer 124 converts some of the information provided by filter 122 into a format (e.g., abbreviation index 116) suitable for helping query processor 108 deliver relevant results to user 106.

The examples described herein refer to a user including a short form of a term (an abbreviation) in a query and receiving results that may also include appropriate expansions of that short form. The techniques described herein can also be adapted to do the reverse—to recognize when a long form (also referred to herein as an "expansion") is included in a query and include results associated with a short form of the expansion.

Short or long forms may also include permutations of the "correct" version of the form. Examples include misused acronyms ("PIN number" instead of "PIN"), commonly used but incorrect expansions ("digital video disc" instead of "digital versatile disc"), variations due to local custom ("MVD" vs. "DMV" to mean a state's motor vehicle department), and words later interpreted as acronyms (i.e., "backronyms").

In some embodiments, the infrastructure provided by portions of search system 104 is located on and/or replicated across a plurality of servers rather than the entirety of search system 104 being collocated on a single platform. Such may be the case, for example, if the contents of document store 120 are vast. Similarly, a single module may provide multiple services (e.g., such as a module unifying scraper 114 and filter 122), and/or the functionality of a component shown in FIG. 1 may be partitioned and provided by a plurality of modules, as applicable. Elements typically provided in a search system, such as a crawler and assorted scoring engines are not shown but may be included. Also as applicable, information such as abbreviation index 116 and word index 118 may take a variety of forms (e.g., as a table, an array, or any other suitable data structure) and may be similarly be stored in a variety of fashions (e.g., on disk, in memory, or with portions or versions in each).

Figure 2:
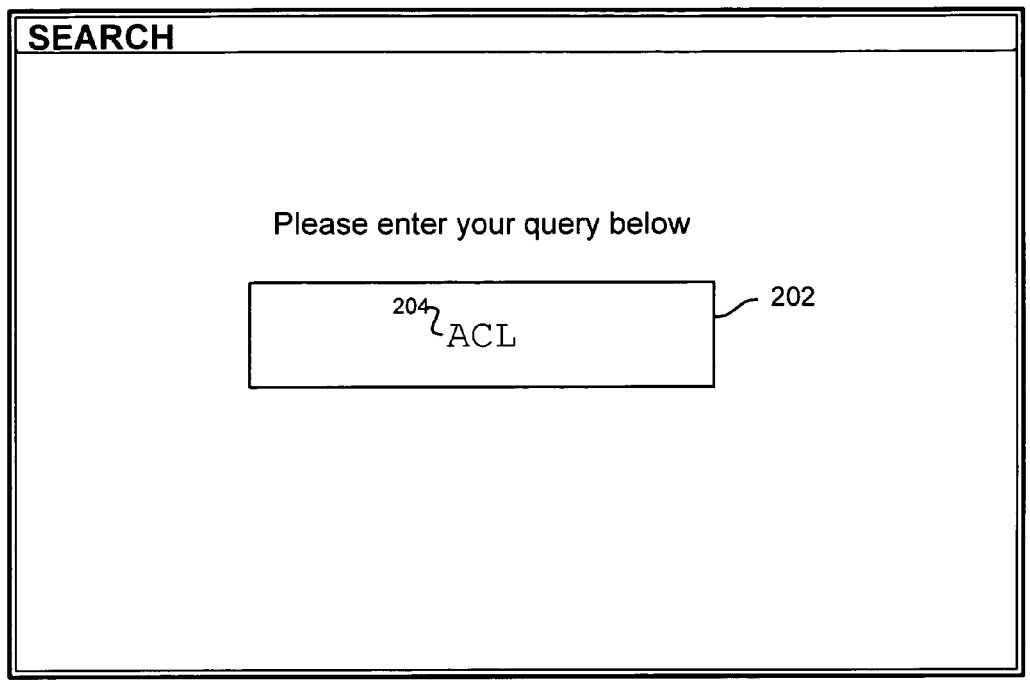
FIG. 2 illustrates an embodiment of an interface for obtaining a query.

FIG. 2 illustrates an embodiment of an interface for obtaining a query. The example shown is an implementation of an interface to search system 104 as rendered in a browser on client 106. In this example, interface 200 includes a region 202 into which a user can submit a query 204. The interface shown provides general search capabilities, aimed at providing visitors the ability to search the entire Web across all topics.

In the example shown, the user has entered a single term, "ACL," as a query (204). Several phrases have "ACL" as a possible abbreviation. For example, "ACL" may mean "access control list," "Association for Computational Linguistics," "Association for Consortium Leadership," "anterior cruciate ligament," "Australian corporations law," "advanced computing laboratory," "Allegro Common Lisp," "anti-Communist labor," etc. Some of the expansions are predominantly used in the context of computers and programming (e.g., "Allegro Common Lisp" and "access control list"). Other of the expansions are predominantly of a health nature ("anterior cruciate ligament"), or related to law ("Australian corporations law").

The relevance of particular documents in collection 102 to the user's query 204 is likely to largely depend on the context in which the user is searching. If the user is interested in the medical use of the term "ACL," pages about a programming, irrespective of how informative those pages may be, are likely to be of little interest to the user. As described in more detail below, context can be provided to search server 104 in a variety of ways.

Figure 3:
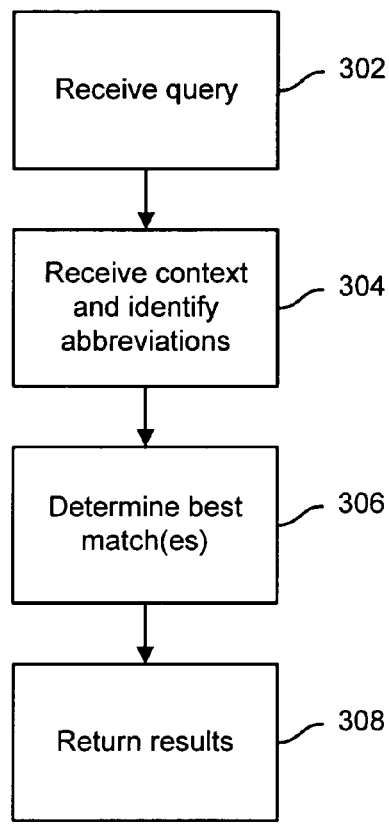
FIG. 3 is a flow chart illustrating an embodiment of a process for delivering a search result.

FIG. 3 is a flow chart illustrating an embodiment of a process for delivering a search result. The process begins at 302 when a query is received, such as through interface 200 as shown in FIG. 2. Other clients may also be used as applicable, such as a handheld device (such as a PDA) or a mobile phone. "Submit" and "enter" are used interchangeably to describe the process of providing a query (e.g., by client 106 to search server 104). A query can be submitted or entered by keyboard, by voice, or by any other appropriate input method. The query received at 302 may be a single term, such as "ACL," or it may be composed of multiple terms. In some embodiments, the portion of the process performed at 302 is implemented by query processor 108.

At 304, the context of the query is received and potential abbreviations present in the query are identified. In some embodiments, the portion of the process performed at 304 is implemented by abbreviation engine 110. One way of determining the presence of an abbreviation in a query is to treat terms entered in all capital letters as an abbreviation. Another way of determining the presence of an abbreviation is to check the query terms against a short form list. In some cases, whether or not a term is considered a potential abbreviation depends on the presence of other words in the query. For example, a term such as "all" entered by itself is more likely to be an abbreviation than when combined with other terms, such as "collect all five."

Context can be obtained in a variety of ways. If the user is searching using a customized interface (e.g., a "health search") such as by checking a box to limit results to a particular topic, context can be obtained from the user's overt choice. Similarly, a user may have the option of specifying areas of interest in a user profile to be used whenever searching with search server 104. How a user arrived at an interface to search server 104 can also be used to determine context. For example, if the user's referrer information indicates that the user arrived via a heart association page, the query submitted by the user is more likely to be health related than if the user arrived via a shopping or auction site. Context can also be gleaned from a user's search history. Suppose, for example, that prior to entering "ACL" into interface 200, the user entered "knee injury" or "surgeon." Such queries are less ambiguously related to health and thus may indicate that the current query (ACL) is also a health query.

Context can sometimes be determined from the query itself. For example, suppose that instead of "ACL" the user entered a query of "ACL clinic" or "ACL recovery." In some embodiments, word index 118 includes a dictionary of words and topics with which they are associated. Abbreviation engine 110 is configured to evaluate the query terms against those stored in word index 118 to determine a context for the query.

At 306, the best matches (e.g., between a short form and a long form) are determined. In some embodiments, the portion of the process performed at 306 is implemented by abbreviation engine 110. As described in more detail below, expansions can be scored and ranked by such factors as their affiliation with a particular topic ("MRI" is very likely to be used in a health context) and their popularity (e.g., within collection 102 as a whole). If context cannot be ascribed to a term (e.g., a user is visiting the site for the first time or the term is particularly ambiguous, such as "MS"), in some embodiments, a variety of possible expansions are presented to the user. For example, the top ranked expansion (i.e., having the highest expansion score) from the top three categories is provided so that the user can guide the search results accordingly.

If context can be ascribed to a term, such as ACL, then results relevant to that context can be provided to the user and results relevant to other contexts can be omitted as applicable. Thus, if "ACL" is queried using a health search, only results associated with the health related expansions (e.g. anterior cruciate ligament) will be presented. If "ACL" is queried using a "computer/technology" search, only results having to do with computers and technology (e.g. access control list) will be provided.

In some cases, such as when there are relatively few short form/long form pairs (e.g., due to a particularly long acronym), all matches may be designated as "best" matches at 306.

At 308, results are returned, e.g. to client 106. The user experience and what results presented can vary e.g., as a result of the processing performed at 304 and 306. In some cases, the most likely expansion (e.g., as determined at 306) is automatically ANDed or ORed with the query received at 302 and prior to delivering results at 308. In some cases, the user is first polled to determine whether the expansion is correct. In some embodiments, the weight given to terms within the query may vary. If, for example, the expansion has a high expansion score (as described in more detail below), results having the expansion in them may be ranked highly. Similarly, if the expansion has a low expansion score, the presence of the expansion in a particular result may factor very little, or negatively, into whether it is presented at 308.

Figure 4:
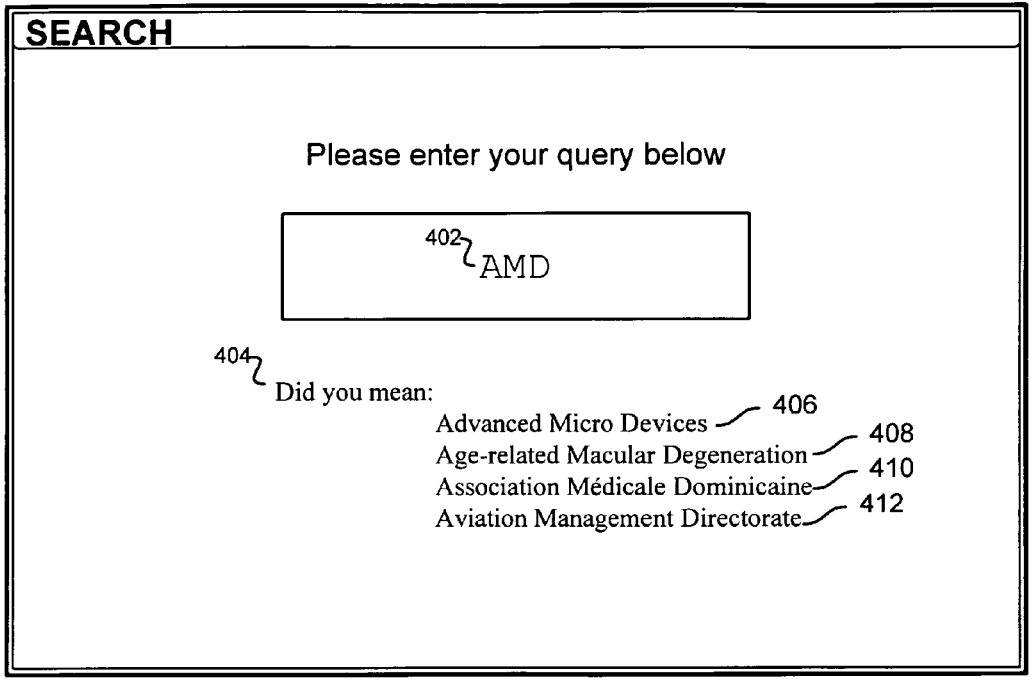
FIG. 4 illustrates an embodiment of an interface for obtaining a query.

FIG. 4 illustrates an embodiment of an interface for obtaining a query. The example shown is an implementation of an interface to search system 104 as rendered in a browser on client 106. In this example, a user has submitted a query (402) of the abbreviation, "AMD" via interface 400. The interface shown provides general search capabilities, aimed at providing visitors the ability to search the entire Web across all topics. AMD has several possible expansions related to different fields. To help disambiguate the query being performed by the user, several possible expansions are presented to the user in order of their popularity (e.g., the number of occurrences of each expansion across all documents in collection 102) in region 404.

In the example shown, "Advanced Micro Devices" (computer-related) is the most popular expansion—the one appearing the most times across all of the documents in collection 102. It is presented to client 106 first accordingly (406). The next most popular expansion is "Age-related macular degeneration" (health-related) and is presented next (408). If the user were to select one of these expansions, the expansion would be incorporated into the query and the results presented to the user would be refined accordingly.

In the example shown, a threshold is applied by search system 104 such that no more than a proscribed maximum of four expansions is presented to a user. If more than four expansions are possible, only the top four are presented. In some embodiments, other thresholds may be applied, such as requiring that expansions have an expansion score above a certain value. Similarly, in some embodiments the expansions presented to a user include an indication of the topics with which they are associated and/or are grouped by topic rather than ranked by overall popularity.

The third most common expansion, "Association Médicale Dominicaine" (410) is health related, and refers to a Haitian medical association. In some embodiments, user preference, IP address, or other indicators of a user's locale may be used to omit foreign results and/or results in foreign languages. For example, if client 106 has specified to only receive English results, expansion 410 may be not be presented in interface 400.

Figure 5:
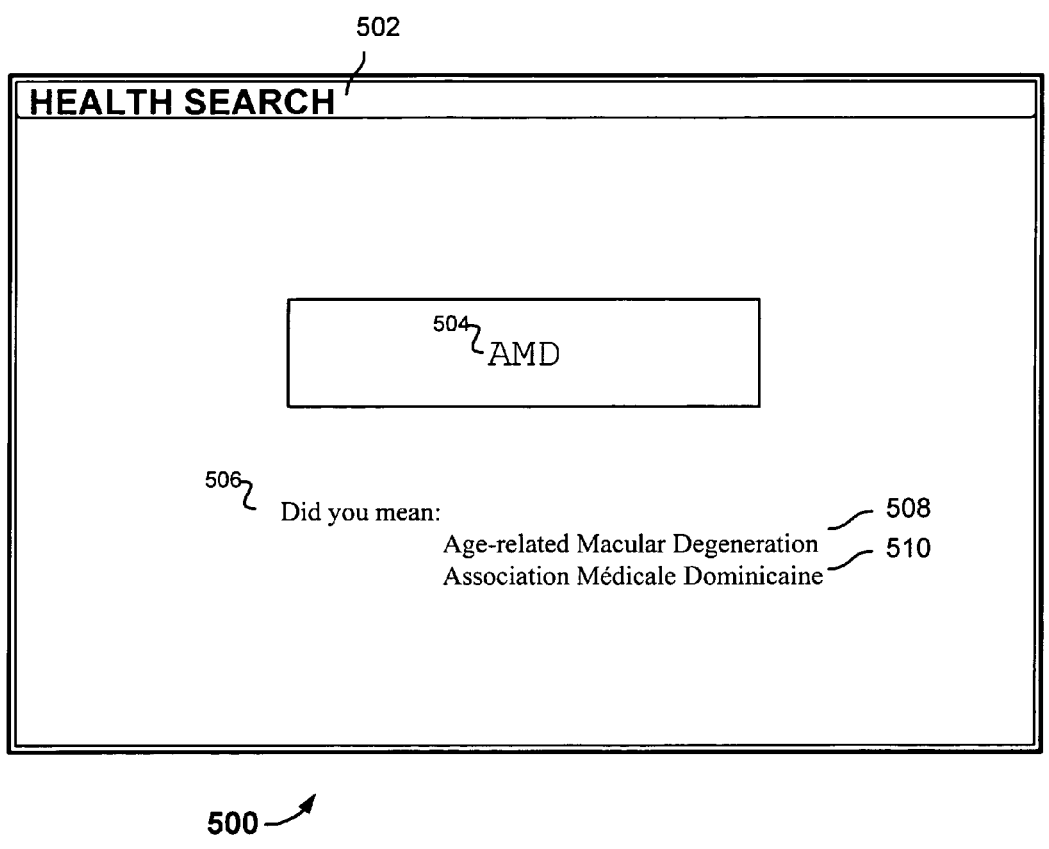
FIG. 5 illustrates an embodiment of an interface for obtaining a query.

FIG. 5 illustrates an embodiment of an interface for obtaining a query. The example shown is an implementation of an interface to search system 104 as rendered in a browser on client 106. In this example, a user has submitted a query (504) of "AMD" via interface 500. The interface shown provides health-specific search capabilities (502), aimed at providing visitors the ability to search a health flavored cut of the web. In the example shown, only the expansions most relevant to the topic, health, are presented. Expansion 508 ("advanced macular degeneration") is presented first because it is the most popular health-related expansion of "AMD." "Advanced Micro Devices" is not presented as a possible expansion in region 506 because, while it is a popular or commonly used expansion, it is not related to health. In some embodiments, users are presented with a topic-specific interface based on the queries they submit. For example, if a user entered "AMD treatment" or "AMD doctor" as a query into interface 200 of FIG. 2, interface 500 may automatically be substituted by search system 104.

Figure 6:
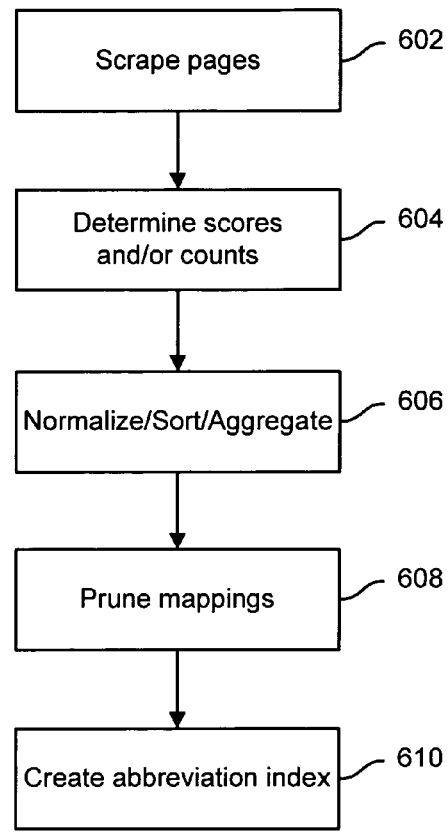
FIG. 6 is a flow chart illustrating an embodiment of a process for determining short/form long form pairs having an association with one or more topics.

FIG. 6 is a flow chart illustrating an embodiment of a process for determining short/form long form pairs having an association with one or more topics. In some embodiments the process show in FIG. 6 is implemented by abbreviation backend 112.

The process begins at 602 when pages in document store 120 are scraped, such as by scraper 114. In some embodiments, rather than or in addition to scraping pages in document store 120, documents in collection 102 are scraped at crawl time. Any appropriate algorithm may be employed to identify or scrape abbreviation and expansion pairs. One way of scraping document store 120 for pairs is as follows. A document in store 120 is parsed to find one or more anchor points. Examples of anchor points include words appearing in uppercase and words appearing inside parentheses—indications that an abbreviation may be present in or near the anchor point. Information in a window around the anchor points is examined in an attempt to find phrases (long forms) that correspond with abbreviations (short forms) on the page. Scraper 114 compiles a list of possible short form/long form pairs (also referred to herein as "abbreviation pairs").

In various embodiments, the pairs scraped at 602 are predetermined and stored before a corresponding abbreviation is queried. Depending on factors such as the size of collection 102, expansion pairs can also be identified in real time, e.g., at or around the time an abbreviation is queried. Similarly, some portions of the process shown in FIG. 6 may be run as batch jobs at different times or at different intervals than other portions of the process.

At 604, various scores and/or counts for the abbreviation pairs are determined as applicable, for use in associating one or more expansion scores with each pair. Expansion scores may typically be based on a combination of a popularity score and one or more topic specific scores and used to rank expansions relative to other expansions. In various embodiments, a variety of scoring techniques may be used to form an expansion score.

One way to determine a popularity score for an expansion is to take a document frequency score as follows. Determine the number of documents in the corpus in which a particular expansion pair (or the long form of the pair) appears. A document frequency score for the expansion can be computed as the absolute number of documents in which the abbreviation and/or expansion appears, or as a relative measurement (i.e., the number of documents in which a particular abbreviation and/or expansion appears relative to the total number of documents in the corpus).

A popularity score can also be based at least in part on a phrase frequency (e.g., the number of times the abbreviation and/or expansion appears). As with the document frequency score, the phrase frequency can be computed as an absolute number of the times the abbreviation and/or expansion appears, or the number of times the abbreviation and/or expansion appears relative to the total number of words in the corpus. In some embodiments, the popularity score is computed by using an appropriate function to combine the document frequency and the phrase frequency, e.g., by taking a weighted sum of these two scores.

Topic specific scores can also be assigned to abbreviation pairs. One way of assigning a topic specific score to an abbreviation pair is to evaluate each of the words in the corresponding expansion with respect to a topic and to combine the specific scores of the individual words into a topic score for the expansion. For example, the expansion of the abbreviation "MS" may comprise the two words: "multiple" and "sclerosis." Word index 118 includes a dictionary of words, along with an evaluation of how related those words are to assorted topics. By evaluating each of the words in an expansion against the information included in word index 118, a topic specific score (or topic relevant score) can be determined.

In the multiple sclerosis example, the word, "multiple" is topic agonistic—use of the word is unlikely to implicate a particular topic. "Sclerosis," however, is a medical term that is very likely to implicate a health topic. Thus, in some embodiments, the topic specific score is directly proportional to the individual topic specific scores of the words comprising a particular expansion of an abbreviation. In some cases, such as with the term, "magnetic resonance imaging," the individual words in the expansion may all be topic agnostic, yet the phrase as a whole may have a meaning that is very specific to a topic (such as health). Accordingly, in various embodiments, topic specific scores are assigned to expansions based on multiple factors or by using different techniques than a per-word evaluation.

The topic specific score of an expansion can also be based on a combination of information such as the topic specific scores of the individual words in the expansion, the number of words in the expansion, and the number of relevant words versus the number of non-relevant words.

In some embodiments, the topic specific score of an expansion is based at least in part on a text-based score (i.e. the number of times the expansion appears in text). One example of a text-based scoring scheme would be to use the relative frequency of the expansion in documents associated with the given topic (i.e. the frequency of the expansion in topic specific documents compared to the frequency of the word in all documents in the corpus).

Relative frequency can also be determined using a chi squared measure. If an expansion appears more times in topic specific documents than in non-topic specific documents, the expansion may be construed to be a topic specific word.

In some embodiments, the topic specific score of an expansion is based at least in part on a link-based score (i.e., the average relevance of the documents in which the expansion appears to the topic). For example, the topic relevance scores of all documents in which the expansion appears may be averaged for the given topic to determine the link-based score. As described in more detail below, techniques such as DIFR and Topic Relevance can be used to associate one or more topic relevant scores with documents. Resources such as dictionaries and directories (e.g., the Open Directory Project) may also be used instead of or in conjunction with such techniques.

Different types of topic specific scores (e.g., text-based and link-based scores) of a particular expansion can also be combined to form a composite topic specific score for the expansion in a given topic.

At 606, the candidate abbreviation pairs are normalized (e.g., through use of techniques such as stemming and case folding) to account for such variations as differences in spelling, case, etc. Similarly, punctuation such as hyphens and accents may also be removed or normalized at 606. Also at 606, discovered abbreviation pairs are bunched and collapsed so that information associated with all variations of a mapping (e.g., the scores determined at 604 for each instance of the expansion) are collapsed together and aggregated, resulting in a final set of scores (e.g., popularity scores and topic specific scores) for each expansion pair.

At 608, certain mappings discovered at 602 are optionally removed, for example, to keep resulting abbreviation index 116 a manageable size. Examples of mappings which may be removed at 608 include expansions occurring in a foreign language, and/or mappings having one or more scores below a threshold.

At 610, an abbreviation index, such as abbreviation index 116 is created and includes information such as a mapping between short forms and long forms, and popularity and topic specific scores associated with abbreviation pairs.

As described above, search system 104 can use the information stored in abbreviation index 116 to provide relevant abbreviations and abbreviation expansions to users.

In some cases, such as when combining two or more scores, it may be necessary to normalize those scores. One way of normalizing a score is with respect to a bell curve or normal distribution. For each type of score, the average score ($\mu$) and the standard deviation of the scores ($\sigma$) may be computed over the entire corpus. For example, for the text-based score, the average text-based score ($\mu_{tb}$) and the standard deviation of the text-based scores ($\sigma_{tb}$) may be computed over all words in the corpus. Likewise, the average link-based score ($\mu_{lb}$) and the standard deviation of the link-based scores ($\sigma_{lb}$) may be computed over all words in the corpus.

Any particular score can then be normalized by determining the number of standard deviations the particular score is from the mean of that score. For example, the text-based score of a particular expression can be normalized by determining the number of standard deviations $\sigma_{tb}$'s (or $\sigma_{lb}$'s) the score is from the average text-based score $\mu_{tb}$ (or $\mu_{lb}$) over all words. A weighted combination of the normalized text-based and link-based scores may be used to determine the topic specific score of a word.

The aforementioned technique of normalizing over an entire set (e.g., collection 102) and determining the number of standard deviations a score of an element of the set is from the mean of the entire set to determine a corresponding normalized score may be used to normalize any two or more dissimilar scores that need to compared and/or combined together (e.g., the document frequency and phrase frequency, the popularity score and the topic specific score, the text-based score and the link-based score, etc.). The logs of the scores in the entire set may be computed and the means and the standard deviations of the logs may be computed and associated with a corresponding bell curve. Two or more scores that are combined to produce another score may be combined after normalization by appropriately weighting each of the individual scores.

Further examples of determining an expansion score associated with a particular expansion of an abbreviation are as follows. Normalized popularity and topic specific scores can be combined, optionally using an appropriate set of weights. For example, an expansion score can be computed by weighting the popularity score by 0.2 and the topic specific score by 0.8 when these scores are combined. In other cases the expansion score may be computed by weighting each of the popularity and topic specific scores by 0.5. Presenting expansions based at least in part upon topic affinity may give more relevant expansions for a given search context. Moreover, presenting expansions based at least in part on their popularity allows the expansions to be appropriately ranked within the search context.

Additional Embodiments

The techniques described herein have generally been illustrated in the context of returning search results. Topic relevant abbreviations can also be used in other areas. For example, returned results may include snippets that highlight query terms as they appear on a result. In some embodiments, abbreviations and their corresponding expansions are both highlighted, irrespective of which was included in the query.

Some search systems provide advertising in conjunction with returning results. Which advertisements are shown may depend on entered query terms. In some embodiments, advertisements associated with expansions are automatically displayed when abbreviations are queried, and vice versa.

In addition to providing abbreviations relevant to high level topics such as "health" and "sports," relevant abbreviations may be determined based on narrower or more specialized groups, such as genres of music ("U2") or movies ("X3").

Suppose a user browses documents in collection 102 using a web browser and encounters an unfamiliar acronym. In some embodiments, search server 104 is configured to provide the user with an indication of the expansion of that acronym. For example, the user may have installed in the browser a plugin that submits the URL of the page the user is currently viewing to search server 104. Search server 104 likely already knows with which category or topics the URL is associated, e.g., due to the page being stored in document store 120. When the user right clicks or otherwise indicates an unfamiliar acronym (e.g., by pausing a cursor over the acronym for a period of time), the browser can convey the expansion (e.g. in a hover over or by causing it to be spoken out loud) by obtaining appropriate information from server 104.

In some cases, abbreviation pairs such as are determined in the process shown in FIG. 6 may be used to help categorize pages that otherwise contain very general terms. For example, a page describing the budget of NASA may use very general terms such as "equipment costs" and "payroll." Because the acronym, NASA, is very likely to indicate the aeronautics entity, however, the page can more properly be classified as being associated with space than having no topic at all.

In some embodiments, abbreviation index 112 is configured to receive manual entries, or mappings and scores not otherwise obtained in via scraping. Such may be the case, for example, with advertising, where an advertiser pays a premium to have acronyms expand preferentially to expansions associated with their products.

Double Iterative Flavored Rank

Figure 7:
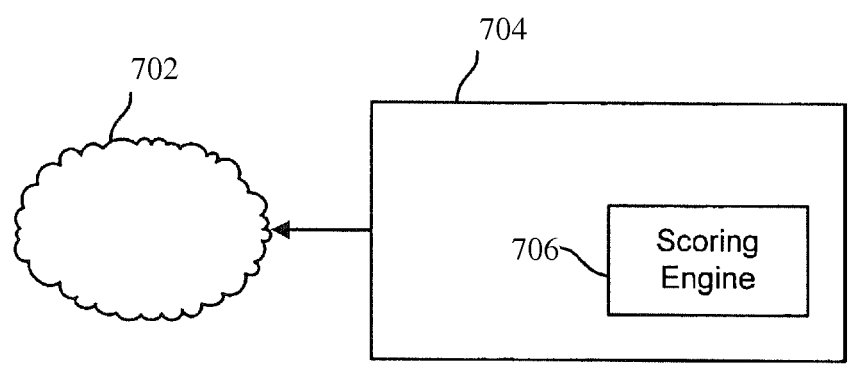
FIG. 7 illustrates an embodiment of a scoring engine.

FIG. 7 illustrates an embodiment of a scoring engine. In the example shown, collection 702 is a group of World Wide Web pages, and is crawled and indexed by a search system 704.

Each document in collection 702 can be thought of as serving two functions: that of a source, and that of a destination. Scoring engine 706 assigns a source score and a destination score to each document in collection 702 based in part on how good of a source and destination, respectively, that document is. In some embodiments, scoring engine 706 is not part of a search system (e.g., it is a standalone scoring system) and/or other components of search system 704 are omitted.

As described more fully below, the scores can be recursively defined in terms of each other.

These source and destination scores can be used to rank pages, for example in response to a search query, based on a variety of functions. In some cases, the source and destination scores of each page are combined into a single score using a weighted average. In some cases, the source scores are ignored and only the destination score is used. In some cases, good sources and good destinations are listed separately in the search results.

Figure 8A:
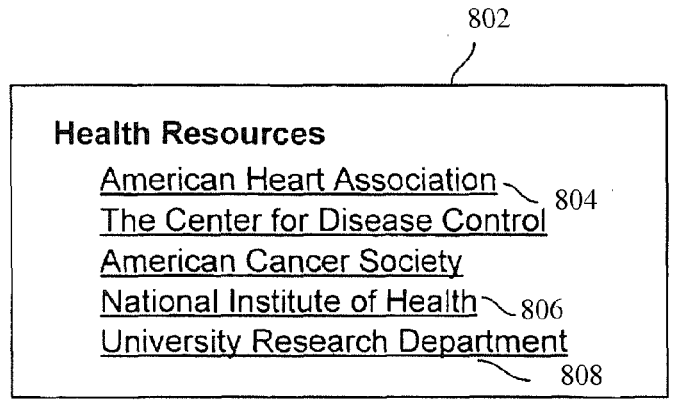
FIG. 8A illustrates an embodiment of a source.

FIG. 8A illustrates an embodiment of a source. In the example shown, a web page 802, titled "Health Resources," contains a number of hyperlinks to websites, such as the American Heart Association (804) and the National Institute of Health (806).

A page can be defined as a "good" source for a topic (e.g., diabetes) if good destinations are "reachable" from it. Thus, a page is a good source for a topic if it guides a visitor in the direction of good destination pages for that topic. A good source need not (but may) contain authoritative information about a topic.

In the example shown in FIG. 8A, the American Heart Association page is reachable by web page 802. This is so because web page 802 contains a direct link (804) to the American Heart Association page. Pages do not need to be directly linked to have reachability, however.

Figure 8B:
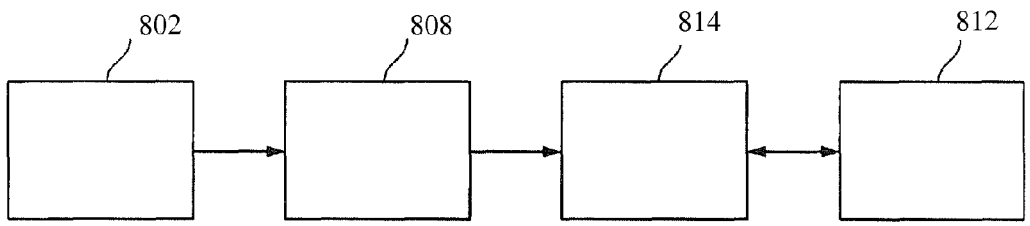
FIG. 8B illustrates an embodiment of pages having reachability.

FIG. 8B illustrates an embodiment of pages having reachability. The Health Resources page (802) contains a link to a University Research Department page (808). The University Research Department contains links to home pages for some of the individual researchers at the institution, such as page 814. In the example shown, a researcher has written page 812, a medical journal article on treating diabetes, which is linked to from the researcher's main page. Page 812 is thus reachable from page 802. As discussed more fully below, the reachability of a page can be conceptualized as the probability that a random surfer beginning on a first page will wind up on a second page.

Figure 8C:
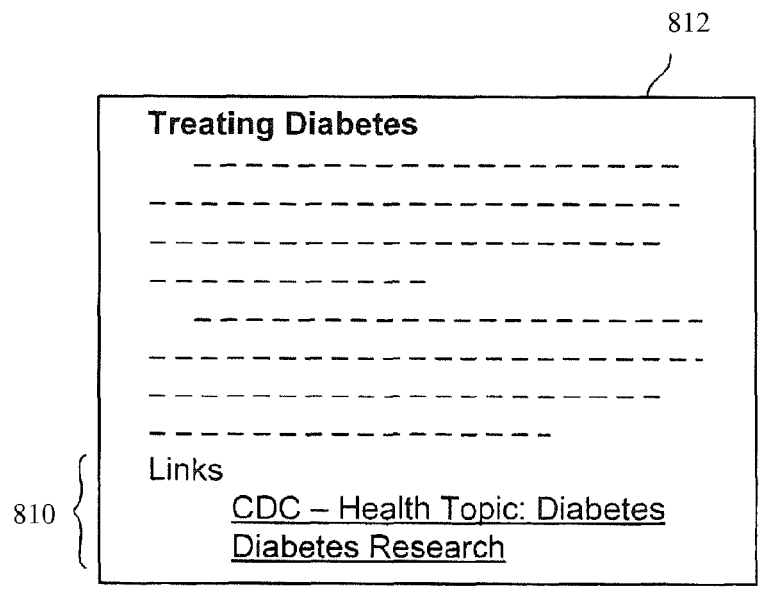
FIG. 8C illustrates an embodiment of a destination.

FIG. 8C illustrates an embodiment of a destination. In the example shown, a web page 812, titled "Treating Diabetes," contains information about treating diabetes. A page can be defined as a "good" destination if it contains useful information about a topic and if that information is likely to be relevant to searches associated with that topic. The example shown also contains hyperlinks to other documents (810), though such links are not necessary for a page to be a good destination. In some cases, a page may simultaneously be a good source and a good destination. This is the case, for example, with page 812, because it presents information about the treatment of diabetes and also includes links for finding additional information about the topic.

Figure 9:
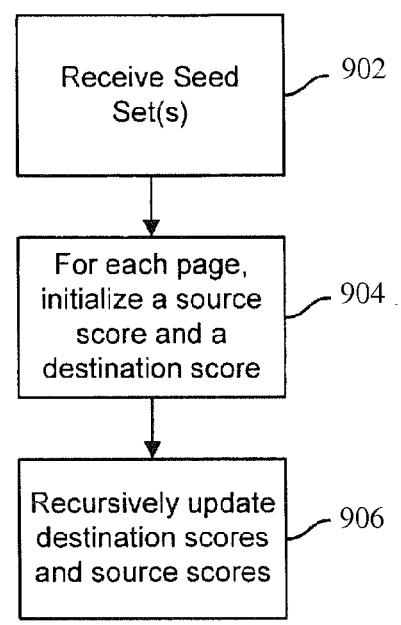
FIG. 9 illustrates an embodiment of a process for scoring documents.

FIG. 9 illustrates an embodiment of a process for scoring documents. This process may be implemented in scoring engine 706. In the example shown, the process begins at 902 when one or more seed sets is received. The seed set can either be a seed set "S" of sources for a given topic, or a seed set "D" of destinations for a given topic. In some embodiments, both source and destination sets are received at 902. In some embodiments, the seed sets are selected by a human and include pages that are considered to be useful or relevant to the topic. In some embodiments, the seed sets are created at least in part based on a directory service, such as by creating a set based on links in a Directory Mozilla (DMOZ) category.

The pages included in sets S and D for a topic may be dynamic. For example, as better sources for a topic are located, they may replace or join previously selected seeds in S. Likewise, better destinations—ones with more relevant information or deeper treatment of a topic—may replace or join previously selected seeds in D. As described more fully below, in some embodiments, updating the seed sets occurs automatically, as part of a process for calculating source and destination scores for documents in collection 702.

The dynamic nature of seed sets can be especially important for providing relevant results to queries in topics where authoritative pages are likely to link only to "approved" content, such as positive or flattering information about that topic. Examples include sports teams, music groups, movies, famous personalities (e.g., actors, politicians, movie directors, etc.), companies, and polarized political issues, such as abortion rights. Team websites do not routinely link to fan pages, nor are such pages even reachable from team websites despite the fact that fan pages may contain highly useful and flattering information about a team. The websites of companies such as airlines and hotels do not generally link to (or reach) companies which provide similar services, yet a user interested in travel would generally benefit in a more complete picture of his or her carrier and lodging options. Similarly, an official movie website is unlikely to link to negative reviews of the movie or boycott sites such as moviexsucks.com which can provide potentially valuable information (including rumor and innuendo) about the movie in question.

The documents in collection 702 can be represented as a directed graph. In this example, the graph has N nodes, where N corresponds to the number of documents in collection 702. The directed connections between nodes represent the links between documents. For a particular page, p, Out(p) is the set of outlinks that lead from the page to other pages. These can be represented in the directed graph as forward links of a node p. Similarly, In(p) is the set of inlinks that lead from other pages to page p. These can be represented in the directed graph as backward links of a node p.

For example, in FIG. 8B, document 802 has one outlink. Documents 808 and 812 both have one inlink and one outlink. Document 814 has two inlinks and one outlink.

At 904, for each document in collection 702, a source score and a destination score are initialized. One method of initializing the scores is through use of the following formula:

$$s(p) = \begin{cases} \frac{N}{|S|} & \text{if } p \in S \\ 0 & \text{if } p \notin S \end{cases} \quad (1)$$

$$d(p) = \begin{cases} \frac{1}{|D|} & \text{if } p \in D \\ 0 & \text{if } p \notin D \end{cases}$$

Where:
s(p) is the source score of a page p
d(p) is the destination score of a page p
p is a document in a collection
S is a set of source seeds
D is a set of destination seeds
N is the total number of documents in the collection In this example, vectors s and d encode the source and destination scores of a particular page p in collection 702, respectively. As explained above, N is the total number of documents, such as the total number of documents in collection 702. In some cases, N may instead be the number of pages in a subset of collection 702. In this example, each source seed in S is equally weighted and each destination seed in D is equally weighted. In some embodiments, other methods may be used for initialization, such as by setting specific values for particular pages. This may be the case, for example, where particular seed destinations in D are significantly "better" than other seed destinations in D.

At 906, the destination and source scores of the documents in collection 702 are recursively updated. In the example shown, this is accomplished through use of a random surfer model.

In a typical random surfer model (referred to herein as the unbiased model, performed by an unbiased surfer), a surfer starts at a random page on the web and begins surfing. If the surfer is currently at page p, the page q that the surfer visits at the next time step is determined in the unbiased model as follows: with probability $\beta$, the surfer picks a link uniformly at random from the set of outlinks of p, and follows it to reach a new page; with probability $1-\beta$, the surfer randomly teleports to a page picked uniformly at random from all of the pages on the World Wide Web. The value $\beta$ is typically set to 0.85.

For each page p in collection 702, the probability that the unbiased surfer visits p at the current time step converges to a value that depends only on the link structure of the web. This probability is the unbiased stationary probability of page p and is referred to herein as the "unbiased stationary probability" of page p. The vector r that lists, for each page, its unbiased stationary probability is referred to herein as the unbiased stationary probability vector r, and can be given as:

$$r = \beta A r + (1-\beta) u \quad (2)$$

Where:
r is the unbiased stationary probability vector
$\beta$ is a probability, typically set to 0.85
A is a matrix that encodes the link structure of a collection u is a vector corresponding to uniform random teleportation If there are N pages in collection 702, u has N entries, each equal to 1/N.

Suppose a random surfer preferentially teleports to good sources, rather than teleporting in an unbiased fashion, such as is given above. In this case, the probability that the surfer teleports to a particular page p can be set proportional to the source score of p, s(p). Thus, the surfer teleports to each source with a probability proportional to its source score. A teleport vector for the surfer can be written as $$\frac{s}{|s|},$$

with the factor $$\frac{1}{|s|}$$

normalizing the sum of all the probabilities to 1.

In this example, the link structure of collection 702 is encoded using a matrix A. In general, if page j links to page i, then $$A_{ij} = \frac{1}{|\text{Out}(j)|},$$

and if not, $A_{ij}=0$. A vector b of stationary probabilities for this "biased" walk can be defined by the following formula:

$$b = \beta A b + \frac{(1-\beta)}{|s|} s \qquad (3)$$

Where:
b is a biased stationary probability vector
β is a probability, typically set to 0.85
A is a matrix that encodes the link structure of a collection
s is a source score vector With probability β, the surfer picks a link uniformly at random from the outlinks of p and follows it to reach a new page. With probability 1−β, the surfer teleports to a source s. In this example, every page in collection 702 has at least one outlink. In practice, some pages do not contain outlinks. In that case, such pages can be eliminated using successive sink elimination, and the stationary probability values can be modified as appropriate.

In this example, the destination score of a particular page p (denoted d(p)) is equal to b(p), the page's stationary probability in this biased walk.

Destination scores can be used to compute source scores. Suppose a random surfer has a teleport set that consists only of page p. In such a case, the teleport vector $v_p$ has 1 corresponding to p and 0 corresponding to all other pages. Here, the surfer teleports periodically to page p and continues the random walk from p. This type of walk is referred to hereinafter as a random surfer centered on p and the stationary probability $r_p$ for this random surfer can be given as:

$$r_p = \beta A r_p + (1-\beta) v_p \qquad (4)$$

Where:
$r_p$ is a stationary probability vector centered on p
β is a probability, typically set to 0.85
A is a matrix that encodes the link structure of a collection
$v_p$ is a teleport vector centered on p This equation is actually a set of N equations, one for each page p in collection 702.

The source score of a particular page p can be defined in this example as $r_p$ (p), the stationary probability that the random surfer is on a good destination page (as measured by the goodness of its destination score). Conceptually, a source score is important if important destinations have received a significant portion of their destination scores from the source. One way of defining the source score is given below:

$$s(p) = \sum_{q \in N} r_p(q) d(q) \qquad (5)$$

Where:
s(p) is the source score of a page p
$r_p$ (q) is a stationary probability with respect to p of q
d(q) is the destination score of a page q Here, set N is the set of all pages in collection 702, and page q is a document in collection 702. The source score of a particular page p is calculated by summing the stationary probability with respect to p of each page q multiplied by the destination score of q. To simplify notation in this example, the source score of p can be written as:

$$s(p) = r_p^T \cdot d \qquad (6)$$

In some cases, a popular page q, such as www.yahoo.com, will have a high r(q), where r is the unbiased stationary probability vector, defined above in Equation 2. Because www.yahoo.com has such a high unbiased stationary probability overall, there is a high probability that it will also have a high value of $r_p$ (q). In general, a page p should not be given credit for leading to a universally popular destination, such as www.yahoo.com. One way to correct for this is to define a relative stationary probability of q with respect to p, denoted $w_p(q)$, by:

$$w_p(q) = \frac{r_p(q)}{r(q)} \qquad (7)$$

Where:
$w_p(q)$ is the relative stationary probability of a page q with respect to a page p
$r_p$ (q) is a stationary probability with respect to p of q
r(q) is the unbiased probability of a page q.

The source score of p can then be written as:

$$s(p) = \sum_{q \in P} \frac{r_p(q)}{r(q)} d(q) = w_p^T \cdot d \qquad (8)$$

Where:
s(p) is the source score of a page p
$r_p$ (q) is a stationary probability with respect to p of q
r(q) is the unbiased probability of a page q
d(q) is the destination score of a page q
P is a collection of pages The above definitions of source and destination score allow the source and destination scores to diffuse away from the original seed set. Without correction, the diffusion can quickly lead to topic drift and topic generalization. Topic drift occurs when the set of sources gets "contaminated" by pages that are not relevant to the topic at hand. A related problem is topic generalization. For example, suppose a ranking for the topic "marathon running" is constructed. Many pages on running and other outdoor activities are likely to link to sites about marathons. Such sites will likely receive high source scores, thereby recursively enlarging the destination sites. The result is that the ranking may be for the broader topic of "running" rather than the desired topic of "marathon running."

Two parameters, $\rho$ and $\phi$ can be chosen that control how much weight to assign new sources and destinations, as opposed to those in the original seed sets. The parameter $\rho$ is known as the destination expansion factor and the parameter $\phi$ is known as the source expansion factor. These factors allow some of the probability contained with the seed sets to spread out into documents in collection 702 that were not originally seeds, while retaining a portion of the probability within the seed sets. Thus, the parameters allow for the control of how much a final source or destination score of a page p will depend on the original seed sets.

Here, $0 \leq \rho \leq 1$ and $0 \leq \phi \leq 1$. Using these parameters, the destination score and source score equations can be written, respectively, as:

$$d(p) = \begin{cases} \frac{\rho}{|D|} + (1-\rho)b(p) & \text{if } p \in D \\ (1-\rho)b(p) & \text{if } p \notin D \end{cases} \quad (9)$$

$$s(p) = \begin{cases} \frac{N\phi}{|S|} + (1-\phi)w_p^T \cdot d & \text{if } p \in S \\ (1-\phi)w_p^T \cdot d & \text{if } p \notin S \end{cases} \quad (10)$$

Where:
d(p) is the destination score of a page p
s(p) is the source score of a page p
$\rho$ is a value between 0 and 1, inclusive ($0 \leq \rho \leq 1$)
$\phi$ is a value between 0 and 1, inclusive ($0 \leq \phi \leq 1$)
p is a document in a collection
S is a set of source seeds
D is a set of destination seeds In this example, $\rho$ and $\phi$ are the percentage of the scores remain within their respective, original, sets, and $1-\rho$ and $1-\phi$ are the percentage of the scores may drift out. There are a few special cases that can occur depending on how the $\rho$ and $\phi$ values are selected. If $\rho$ and $\phi$ are both set to 1, the source and destination scores will be held constant at their initial values. If $\rho$ and $\phi$ are both set to 0, unbiased source and destination scores result. If $\rho$ is set to 1 and $\phi$ is set to 0, the destination set will be fixed and only the source scores will vary. If $\rho$ is set to 0 and $\phi$ is set to 1, the source scores will be constant and only the destination scores will vary.

The equations presented in conjunction with portion 906 of FIG. 9 are given in part to help conceptualize a process for computing source and destination scores. While the equations presented can be used to compute source and destination scores, to do so would require, for each page p, a very large number of computations, especially when collection 702 is large. As described more fully below, in some embodiments, more efficient processes are employed to iteratively calculate source and destination scores, such as are described in conjunction with FIGS. 5 and 6.

A simplified numeric example of an iterative version of the process shown in FIGS. 9 and 5 is given in FIGS. 10A-10E to help illustrate the process conceptually.

Figure 10A:
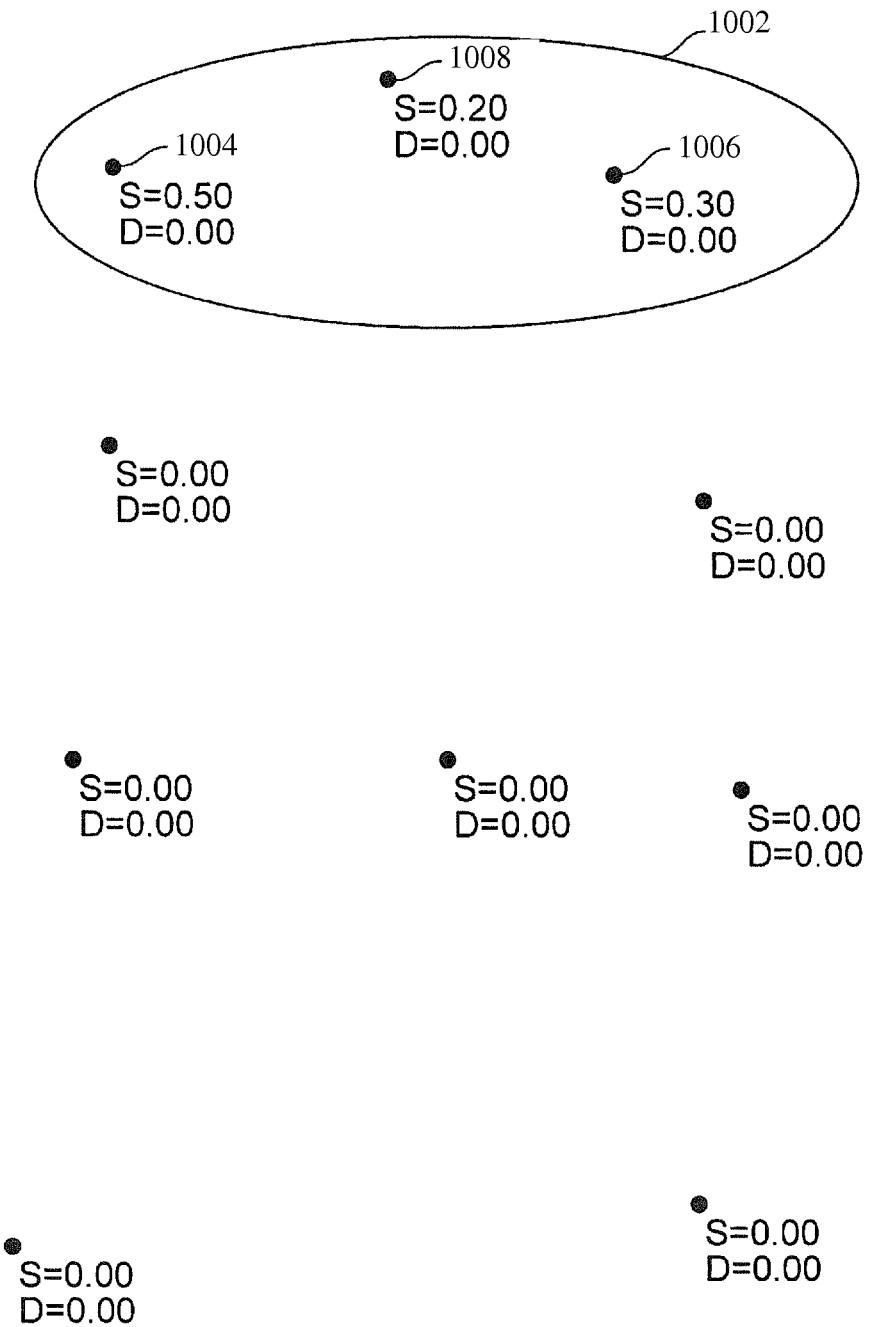
FIG. 10A illustrates a simplified embodiment of a portion of a process for assigning scores to a collection of documents based on a source set.

FIG. 10A illustrates a simplified embodiment of a portion of a process for assigning scores to a collection of documents based on a source set. The process depicted in FIG. 10A could be an example of an implementation of portions 902 of FIGS. 9 and 1104 of FIG. 11 as applied to collection 702. The example shown uses a simplified numerical method for calculating destination scores (d(q)) that are reached during a series of random walks beginning at each node p in the seed set. In the example shown, each node q that is visited during a random walk originating at p is assigned a score given by $d(q)=s(p)-0.1(i^2)$, where i is the distance from the particular source seed p, and s(p) is the source score of that p. Here, distance is defined as the number of hops q is away from p. In this example, if a particular q is visited by multiple ps, the resulting destination scores are summed. If a computed value of a d(q) is negative, in this example, it is set to 0.

For simplicity of illustration, the values given in FIGS. 10A-10E are not normalized to maintain a unity, and are significantly larger than they would likely be in practice, where millions of documents may be included in collection 702.

In the example shown, nodes 1004, 1006, and 1008 are included in a source seed set 1002. Their source seed values are 0.5, 0.3, and 7.0, respectively. Their destination scores are each 0. The other nodes in collection 702 have their source and destination scores initialized to 0.

Figure 10B:
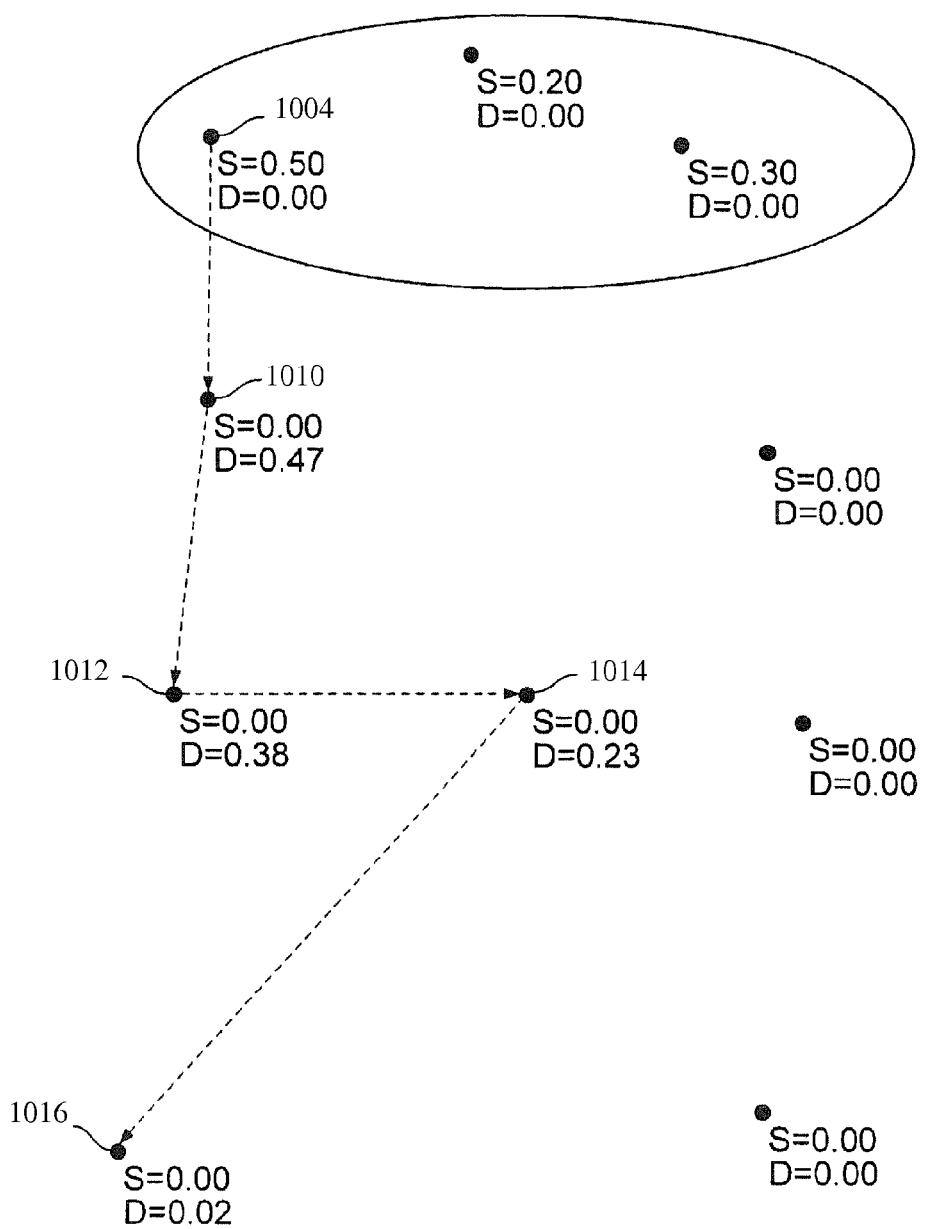
FIG. 10B illustrates a simplified embodiment of a portion of a process for assigning scores to a collection of documents based on a source set.

FIG. 10B illustrates a simplified embodiment of a portion of a process for assigning scores to a collection of documents based on a source set. The process depicted in FIG. 10B could be an example of an implementation of 906 of FIGS. 9 and 1106 of FIG. 11. A random walk beginning at node 1004 is performed. The first page reached from node 1004 is node 1010. Node 1010 thus receives as its destination score a portion of node 1004's source score. In this case, the received score is 0.47. The second page reached from node 1004 is node 1012. Node 1012 receives a destination score of 0.38. The third page reached from node 1004 is node 1014. Node 1014 receives a destination score of 0.23. The final page reached from node 1004 is node 1016. Node 1016 receives a destination score of 0.02. After traversing to node 1016, the random walk teleports.

Figure 10C:
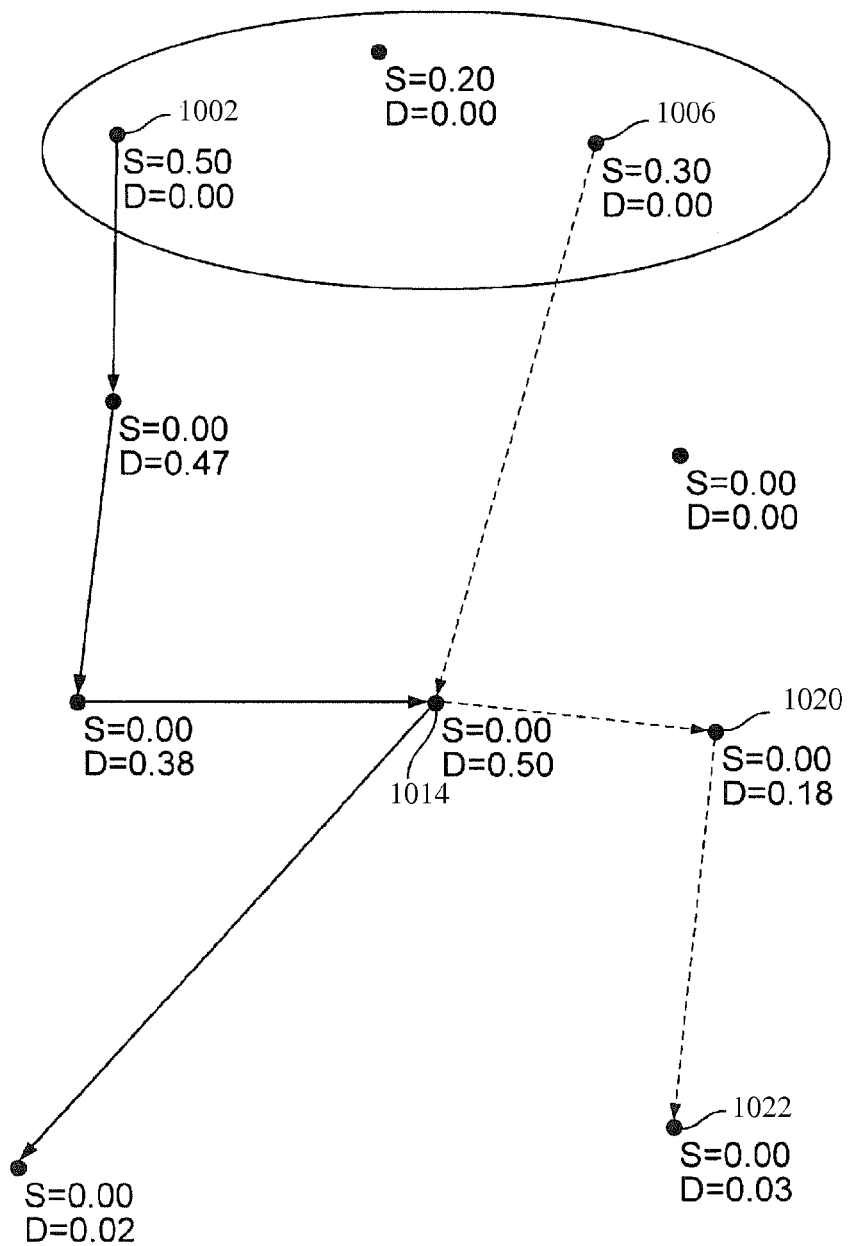
FIG. 10C illustrates a simplified embodiment of a portion of a process for assigning scores to a collection of documents based on a source set.

FIG. 10C illustrates a simplified embodiment of a portion of a process for assigning scores to a collection of documents based on a source set. A random walk beginning at node 1006 is performed. The first page reached from node 1006 is node 1014. In this example, node 1014 was already reached from node 1002 as illustrated in FIG. 10B. As a result, the portion of node 1006's source score (in this case, 0.27) is added to the portion of node 1004's score (as shown in FIG. 10B, 0.23), for a total destination score of 0.50. The second page reached from node 1006 is node 1020. Node 1020 receives a destination score of 0.18. The final page reached from node 1006 before teleport is node 1022. Node 1022 receives a destination score of 0.03.

Figure 10D:
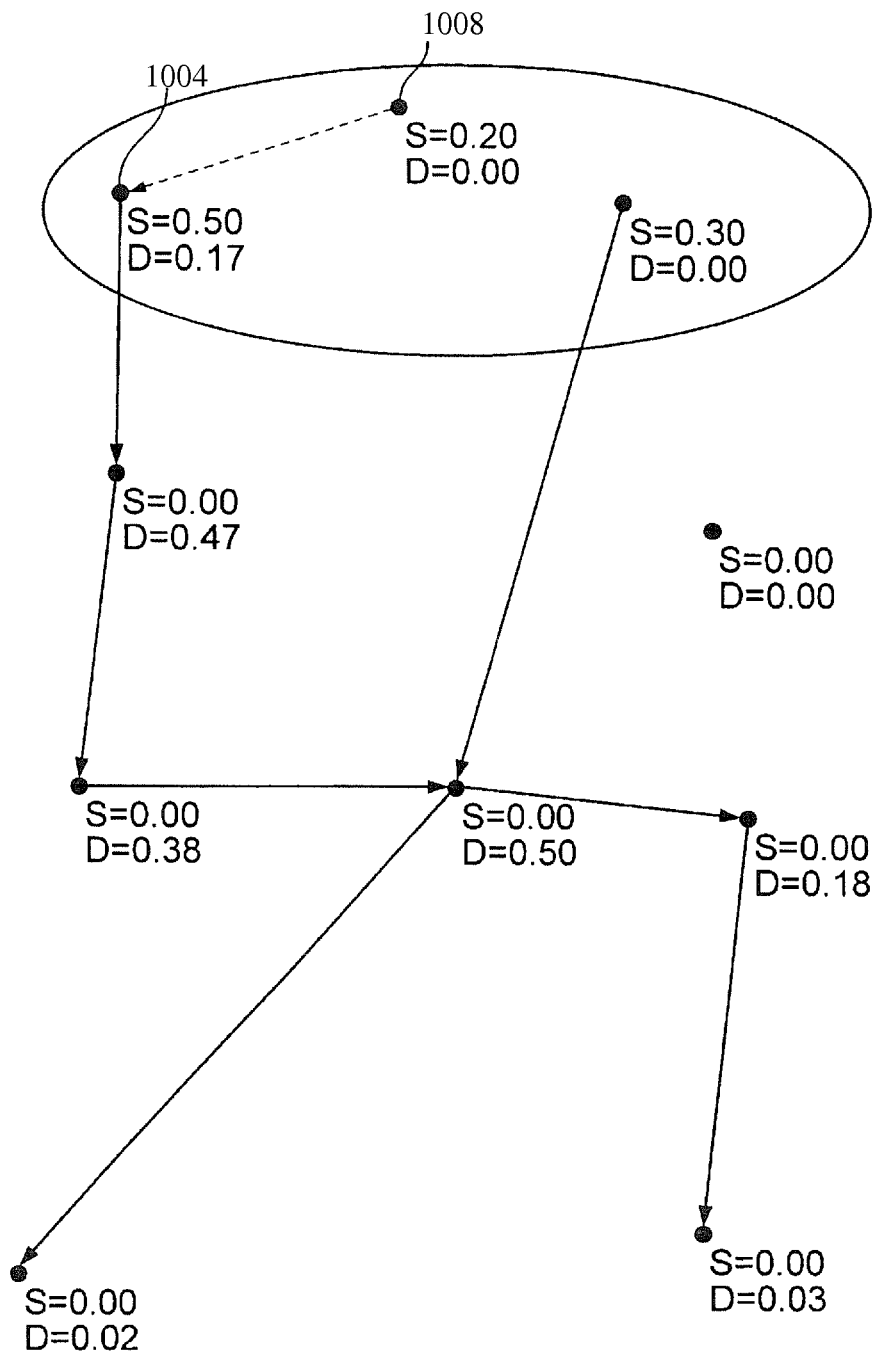
FIG. 10D illustrates a simplified embodiment of a portion of a process for assigning scores to a collection of documents based on a source set.

FIG. 10D illustrates a simplified embodiment of a portion of a process for assigning scores to a collection of documents based on a source set. A random walk beginning at 1008 is performed. In this case, the first page reached from node 1008 is another source seed node, node 1004. Node 1004 receives a destination score of 0.17. At this stage in the example, a random walk starting at each node in the seed set has been made.

Figure 10E:
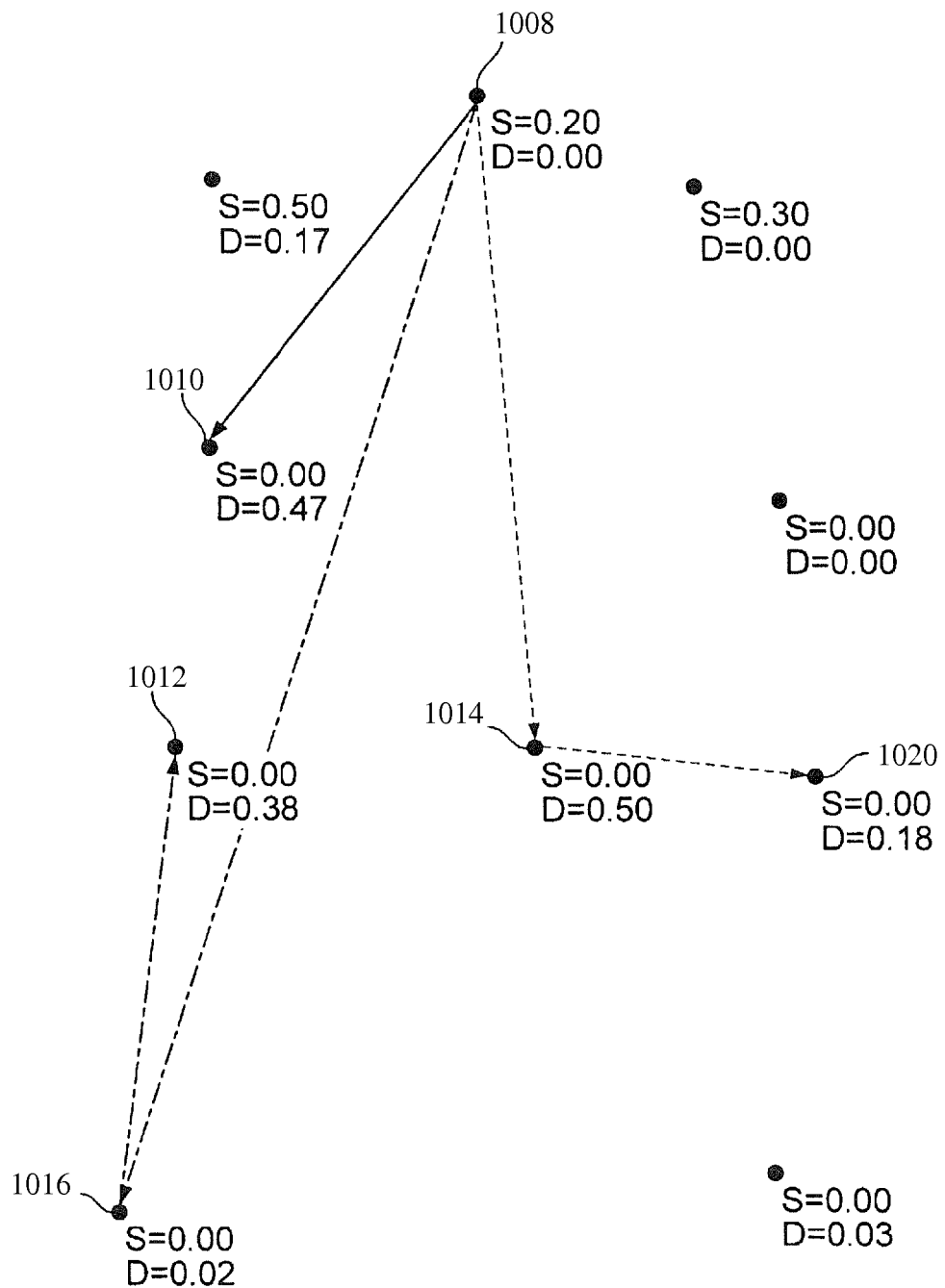
FIG. 10E illustrates a simplified embodiment of a portion of a process for assigning scores to a collection of documents based on a source set.

FIG. 10E illustrates a simplified embodiment of a portion of a process for assigning scores to a collection of documents based on a source set. The process depicted in FIG. 10E could be an example of an implementation of 906 of FIGS. 9 and 1108 of FIG. 11 as applied to collection 702. A source score for a page p can be calculated by determining the percentage of destination score that a page q has received from p and multiplying that by the destination score. The process is repeated for each q, and the results are summed. In the example shown, nodes 1010, 1014, 1020, 1016, and 1012 have each received some portion of destination score from node 1008. The source score of node 1008 could thus be calculated as the percentage of destination score that node 1010 received from node 1008 multiplied by 0.47, summed with the amount of percentage of destination score that node 1016 received from node 1008 multiplied by 0.02, and so on.

Once source scores have been computed for each node in collection 702, a new seed set can be constructed. In some embodiments, all nodes with non-zero source scores are used to form the updated set S. In some embodiments, a threshold is applied. In that case, nodes not previously in S may be added to S if their source scores are large enough. In some embodiments, nodes previously in S whose source scores have decreased may be demoted out of set S. Once a new seed set has been constructed, the process can begin again, and additional computations, such as the additional iterations 1108 and 1110 of FIG. 11 can be performed.

Figure 11:
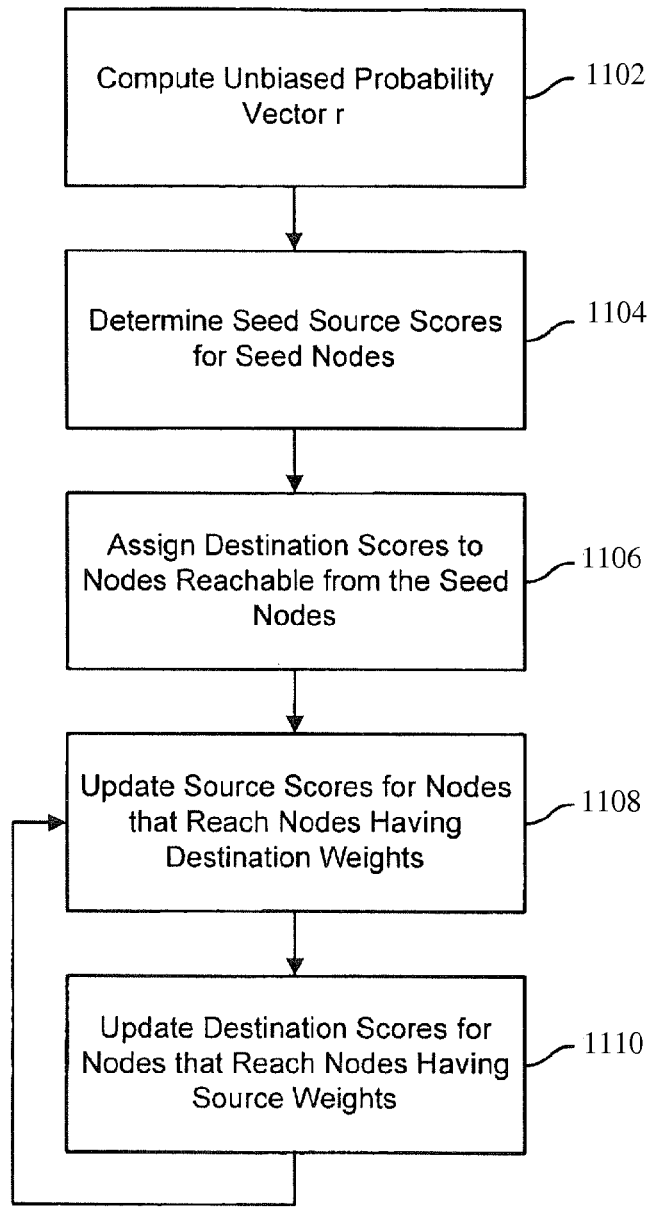
FIG. 11 illustrates an embodiment of a process for assigning scores to a collection of documents based on a source set.

FIG. 11 illustrates an embodiment of a process for assigning scores to a collection of documents based on a source set. In the example shown, the random surfer is modeled through an iterative process. The process begins at 1102 when an unbiased stationary probability vector r is computed, such as through use of the formula given in Equation 2. At 1104, each seed node in the source set is assigned a source seed score. The source and destination scores of the pages in collection 702 are optionally initialized, such as through use of the procedure discussed in conjunction with 904 of FIG. 9. In this example, the destination vector d is initialized to ρd and the source vector s is initialized to φs. Vectors b and z are initialized to 0.

At 1106, destination scores are assigned to nodes reachable from the source seeds. One method for calculating destination scores is as follows:

$$b(p) = \beta \sum_{q \in In(p)} \frac{b(q)}{|Out(q)|} + \frac{(1-\beta)}{N} s(p) \quad (11)$$

$$d(p) = \rho d(p) + (1-\rho) b(p)$$

Where:
d(p) is the destination score of a page p
β is a probability, typically set to 0.85
In(p) is the set of inlinks of a page p
Out(q) is the set of outlinks of a page q
N is the total number of documents in the collection
ρ is a value between 0 and 1, inclusive (0≦ρ≦1)
φ is a value between 0 and 1, inclusive (0≦φ≦1)

In other examples other formulas are used to calculate the destination score. Other appropriate pairs of equations that define source and destination scores in terms of each other may be used. For example, in the embodiment depicted in FIG. 11, all links are treated equally. In some embodiments, link weights (e.g., weights assigned based on anchor text) are used to bias the computation of source and/or destination scores. At 1108, nodes that reach nodes that have nonzero destination scores are assigned source scores. One method for calculating source scores is as follows:

$$z(p) = \frac{\beta}{|Out(p)|} \sum_{q \in Out(p)} z(q) + (1-\beta) \frac{d(p)}{r(p)} \quad (12)$$

$$s(p) = \phi s(p) + (1-\phi) z(p)$$

Where:
s(p) is the source score of a page p
d(p) is the destination score of a page p
r (p) is the unbiased stationary probability of a page p
β is a probability, typically set to 0.85
Out(p) is the set of outlinks of a page p
ρ is a value between 0 and 1, inclusive (0≦ρ≦1)
φ is a value between 0 and 1, inclusive (0≦φ≦1)

In other examples other formulas are used to calculate the source score, as appropriate.

At 1110, nodes reachable from nodes having nonzero source scores are assigned destination scores. As used herein, "evaluation" nodes are nodes which have nonzero source scores, used to evaluate the destination score of a particular web node, or nodes which have nonzero destination scores, used to evaluate the source score of a particular web node. In some cases, evaluation nodes may be used for both purposes. In some embodiments, the process iterates through 1108 and 1110 until convergence. In some cases, such as where collection 702 is large, only a small number of iterations may be needed to achieve useful source and destination scores. In such cases, the process may be terminated before convergence.

Figure 12:
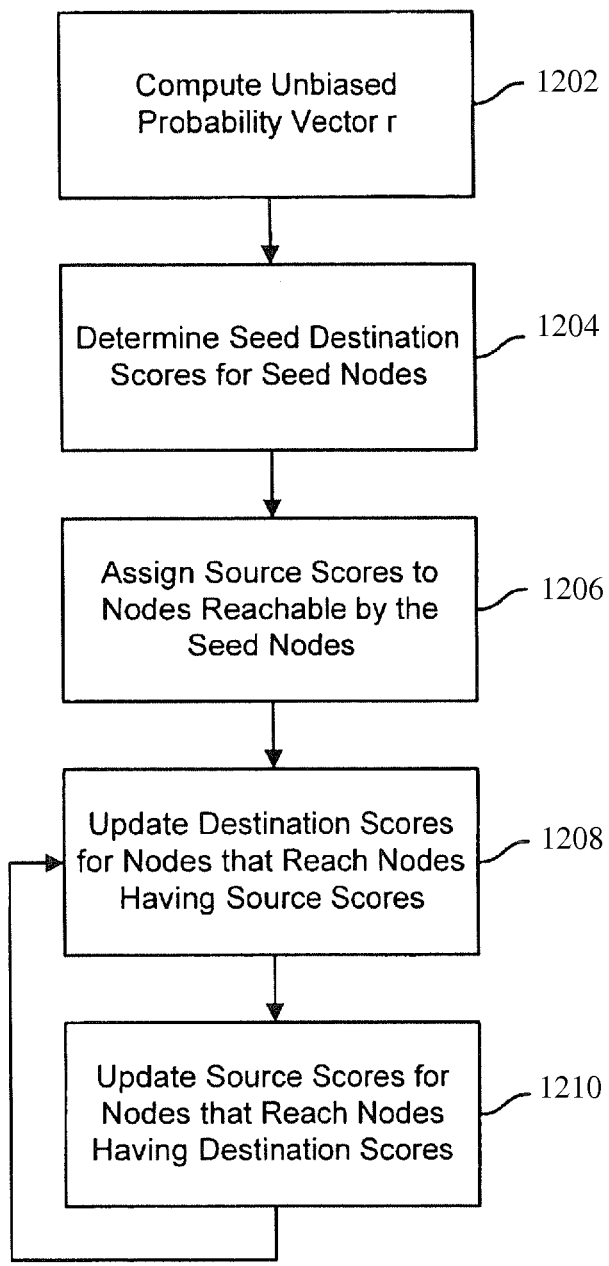
FIG. 12 illustrates an embodiment of a process for assigning scores based on a destination set.

FIG. 12 illustrates an embodiment of a process for assigning scores based on a destination set. The example shown can be used in cases where no known sources for a particular topic exist and the source seed set is empty. In that case, if a good destination or set of destinations is known, the destination set can be used to find a source set. For example, for a particular health topic, such as a rare blood disease, no source seed set may be known. It may nonetheless be known that particular sites are good destinations about the topic. A destination set can be used as appropriate to seed the process.

The process begins at 1202 when an unbiased probability vector r is computed, such as through use of the formula given in Equation 2. At 1204, each seed node in the destination set is assigned a seed destination score. The source and destination scores of the pages in collection 702 are optionally initialized, such as through use of the procedure discussed in conjunction with 904 of FIG. 9. In this example, the destination vector d is initialized to ρd and the source vector s is initialized to φs. Vectors b and z are initialized to 0.

At 1206, nodes that reach the destination seeds are assigned source scores as applicable. At 1208, nodes that are reached by nodes that have nonzero source scores are assigned destination scores as applicable. At 1210, nodes that reach destinations having nonzero destination scores are assigned source scores as applicable. In some embodiments, the process iterates through 1208 and 1210 until convergence. In some cases, such as where collection 702 is large, only a small number of iterations may be needed to achieve useful source and destination scores. In such cases, the process can be terminated before convergence.

Topic Relevance

Figure 13:
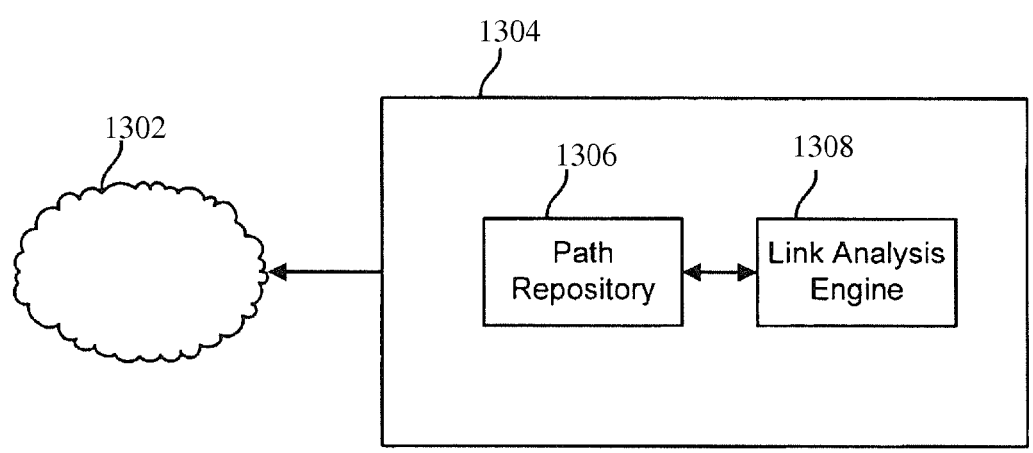
FIG. 13 illustrates an embodiment of a link analysis engine.

FIG. 13 illustrates an embodiment of a link analysis engine. In the example shown, collection 1302 is a group of World Wide Web pages, and is crawled and indexed by a search system 1304.

At least some of the documents in collection 1302 include links to other documents in collection 1302. As described in more detail below, the documents in collection 1302 can be represented as a directed graph (hereinafter the "web graph"). In this example, the graph has N nodes, where N corresponds to the number of documents in collection 1302. The directed connections between nodes represent the links between documents. For a particular page p, Out(p) is the set of outlinks that lead from the page to other pages. These can be represented in the directed graph as forward links of a node p. Similarly, In(p) is the set of inlinks that lead from other pages to page p. These can be represented in the directed graph as the backward links of a node p.

Path repository 1306 contains information associated with the links between the documents in collection 1302. For example, in some embodiments, path repository 1306 contains a table detailing the inlinks and outlinks of each page in repository 1302. In some embodiments, other methods are used to encode linking information.

Link analysis engine 1308 is used to analyze link information such as is provided by path repository 1306. The information can be used, for example, to determine the relevance of a document to one or more topics (which can be defined, e.g., by another document, or a group of documents, such as a seed set). The information can also be used to assign one or more scores to documents. In some cases, multiple scores are combined into a single score such as by using a weighted average. The scores can be used to rank pages, for example, in response to a search query, based on a variety of functions.

In some embodiments, the information in path repository 1306 includes information supplied, such as by a third party, rather than extracted from collection 1302 by a search system 1304. In some embodiments, path repository 1306 and link analysis engine 1308 are not part of a search system (e.g., they form a link analysis system) and/or other components of search system 1304 are omitted.

Figure 14:
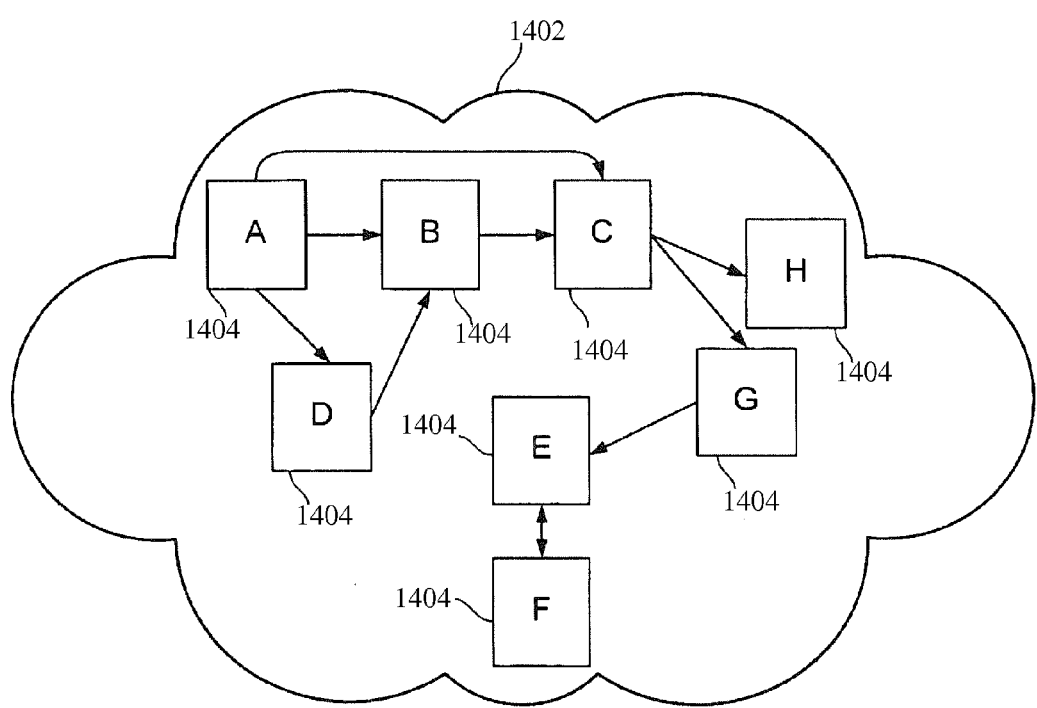
FIG. 14 illustrates sample documents in a collection having link structure.

FIG. 14 illustrates sample documents in a collection having link structure. In the example shown, a collection, such as collection 1302 includes several documents 1404. Here, page A has three outlinks—they lead to pages B, D, and C. The direction of the link is indicated here with an arrow head. Page B has two inlinks (from pages A and D) and one outlink (to page C). Pages E and F link to each other. Thus, page E has two inlinks (page G and page F) and one outlink (page F), while page F has one inlink and one outlink (page E in both cases).

Page B is "reachable" from page A in this case because there is a direct link leading from page A to page B. In addition to direct links, however, a page can also be reachable from pages that are not directly linked. In this example, page C is reachable from page D because a person visiting page D could follow an outlink from page D to page B, and then follow another outlink from page B to page C. As discussed more fully below, the reachability of a page can be conceptualized as the probability that a random surfer beginning on a first page will wind up on a second page.

Figure 15A:
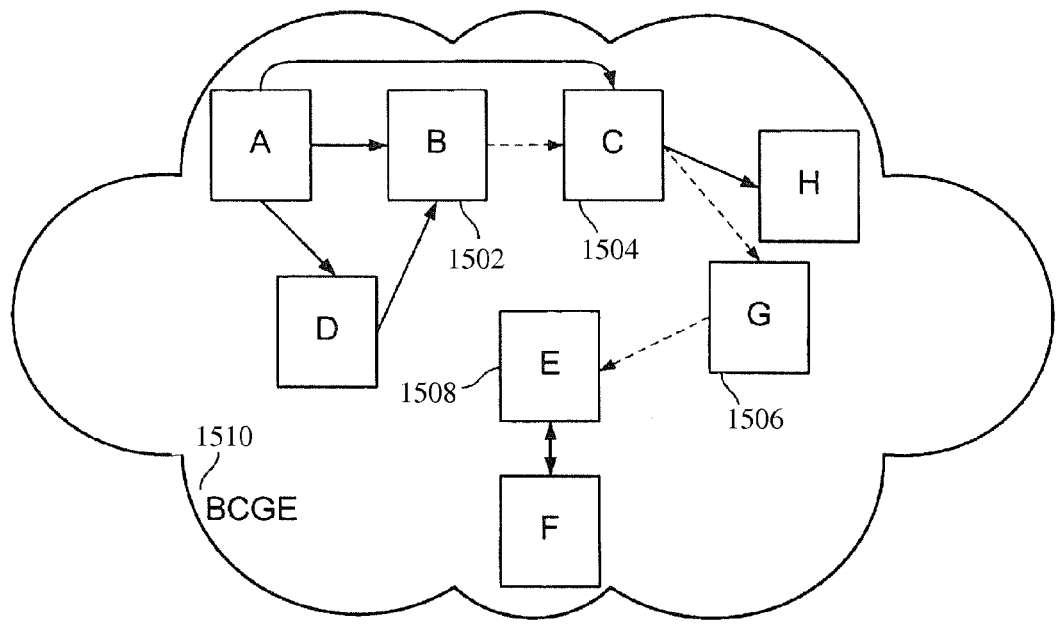
FIG. 15A is an example of a natural random walk.

FIG. 15A is an example of a natural random walk. In a typical random surfer model (also referred to herein as the unbiased model/random walk, performed by an unbiased surfer), a surfer starts at a random page on the web and begins surfing. If the surfer is currently at page p, the page q that the surfer visits at the next time step is determined in the unbiased model as follows: with probability β, the surfer picks a link uniformly at random from the set of outlinks of p, and follows it to reach a new page; with probability 1−β, the surfer randomly teleports to a page picked uniformly at random from all of the pages on the World Wide Web. The value β is typically set to 0.85. The walks that the random surfer performs are referred to herein as "paths." In this example, the generated path indicates that documents could be accessed by following the walk. The walk itself is typically simulated, such as by one or more methods of approximating or modeling the behavior of a random surfer, rather than performing an actual random walk.

For each page p in collection 1302, the probability that the unbiased surfer visits p at the current time step converges to a value that depends only on the link structure of the web. This probability is the stationary probability of page p and is referred to herein as the "Page Rank" of page p. The vector r that lists, for each page, its Page Rank is referred to herein as the Page Rank vector r, and can be given as:

$$r = \beta A r + (1-\beta) u \tag{13}$$

Where:
r is the Page Rank vector
β is a probability, typically set to 0.85
A is a matrix that encodes the link structure of a collection
u is a vector corresponding to uniform random teleportation
If there are N pages in collection 1302, u has N entries, each equal to 1/N A random walk R is composed of many "natural random walks" created by breaking the random walk, R, at each teleportation step. Consider the following random walk, R, made up of assorted web pages (denoted by $W_x$, where x is a number between 1 and N, inclusive) and teleports (denoted T):

$R = W_1 \ W_8 \ W_3 \ T \ W_{12} \ W_2 \ W_3 \ W_{11} \ W_{20} \ W_{31} \ T \ldots$ The natural random walks in R are as follows:
$R_1 = W_1 \ W_8 \ W_3$
$R_2 = W_{12} \ W_2 \ W_3 \ W_{11} \ W_{20} \ W_{31}$
. . . .

In the example shown in FIG. 15A, a natural random walk (denoted by a dashed line) began at page B (1502), continued to page C (1504), then continued to page G (1506), then continued to page E (1508) before teleporting. Thus, in the example shown in FIG. 15A, the natural random walk was of length 4, notated as path BCGE (1510).

Figure 15B:
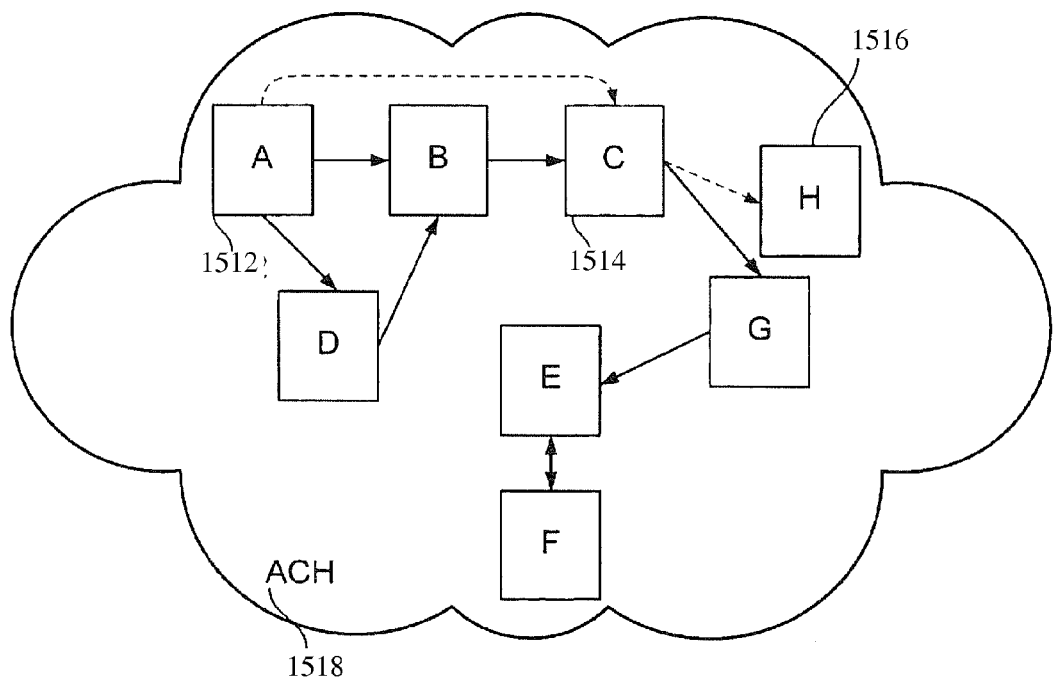
FIG. 15B is an example of a natural random walk.

FIG. 15B is an example of a natural random walk. After teleporting from page E (1508), a new random walk was begun on page A (1512). The walk continued from page A to page C (1514), and then continued to page H (1516) before teleporting. Thus, in the example shown in FIG. 15B, the random walk was of length 3, notated as path ACH (1518).

Market Basket Analysis

As described in more detail below, topic score and topic relevance measure different properties of a page in a topic—popularity and relevance.

The natural random walk framework can be viewed in the context of data mining, in particular market basket analysis. A traditional problem in data mining is determining "association rules" given market baskets.

Assume there is a list of contents of every grocery cart (market basket) that was checked out at a grocery store. This data can be mined to see how some products should be placed in the store. For example, if every purchase of diapers is also accompanied by a purchase of beer, i.e., Diapers→Beer, it may be profitable to locate the beer near the diapers.

Two metrics used in data mining are the confidence (i.e., what is the probability that X→Y) and the support (i.e., how many times do X and Y appear together in the market baskets).

Support can be used to prevent the making of decisions based on very sparse data. For example, if exactly one person purchased vodka, and they bought it with diapers, Vodka→Diapers with confidence 1. However, the support would be very low.

Natural random walks can be seen as market baskets. The topic relevance of a page X in topic F is the Confidence that X→F. The topic score of X is the support. Thus, topic score and topic relevance are fundamentally different metrics. One way to employ both scores is to use support as a threshold and confidence as a final score. In other embodiments, other combinations of the functions are used.

A "distinguished" page is used herein to mean a page that is of interest in determining the relevance of one or more pages to a topic. For example, a highly informative site may be used to define a topic (e.g., medline.com for health, or imdb.com for movies.) As described in more detail below, in some cases, the distinguished page is a member of a group of pages that define a topic. For example, the distinguished page may be part of a seed set of pages, such as the seed sets used in the DIFR process described above.

Figure 16A:
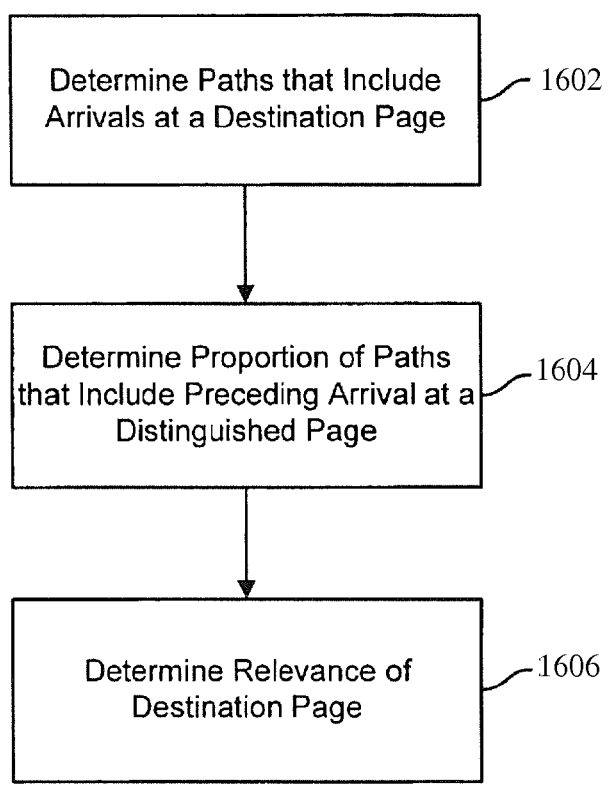
FIG. 16A illustrates an embodiment of a process for determining the relevance of a document.

FIG. 16A illustrates an embodiment of a process for determining the relevance of a document. In this example, the relevance of a destination page to a distinguished node is determined. As described in more detail below, other methods may be used to determine the relevance of one document to multiple documents, and/or to combinations of documents.

This process may be implemented in link analysis engine 1308. In the example shown, the process begins at 1602 when paths that include arrivals at a destination page are determined. A simplified numeric example of an iterative method for determining such paths is given in FIGS. 17A-17D to help illustrate the process conceptually. As described in more detail below, in some embodiments, more efficient processes are employed to implement and/or model the determination of paths.

At 1604, the proportion of paths that include visiting the distinguished page before reaching the destination page is determined. For example, in FIG. 14, if page B is a distinguished node, and page G is a destination node, all paths that lead through page G (e.g., CGE, BCG, GE, ACGE) would be included in the processing at 1602. Only the paths in which page B was visited before page G would be included in determining the proportion at 1604. For example, ABCG and ADBCG visit page G after visiting page B, while CGE does not.

At 1606, the relevance of the destination page is determined. As described in more detail below, various methods of determining the relevance of a destination page may be employed. For example, the relevance of a page to a group of pages may be determined. In some embodiments, relevance is determined by combining multiple values, such as a DIFR score and/or score deta reverse relevance score.

In some embodiments, portions 1604 and 1606 of FIG. 16A are combined—the relevance of a destination page to a distinguished node is determined by assigning a score based on dividing the number of paths that include preceding arrival at a distinguished page by the total number of paths the include arrivals at the destination page. This is the case, for example, in the process depicted in FIGS. 17A-17D and is referred to as a topic score.

Figure 16B:
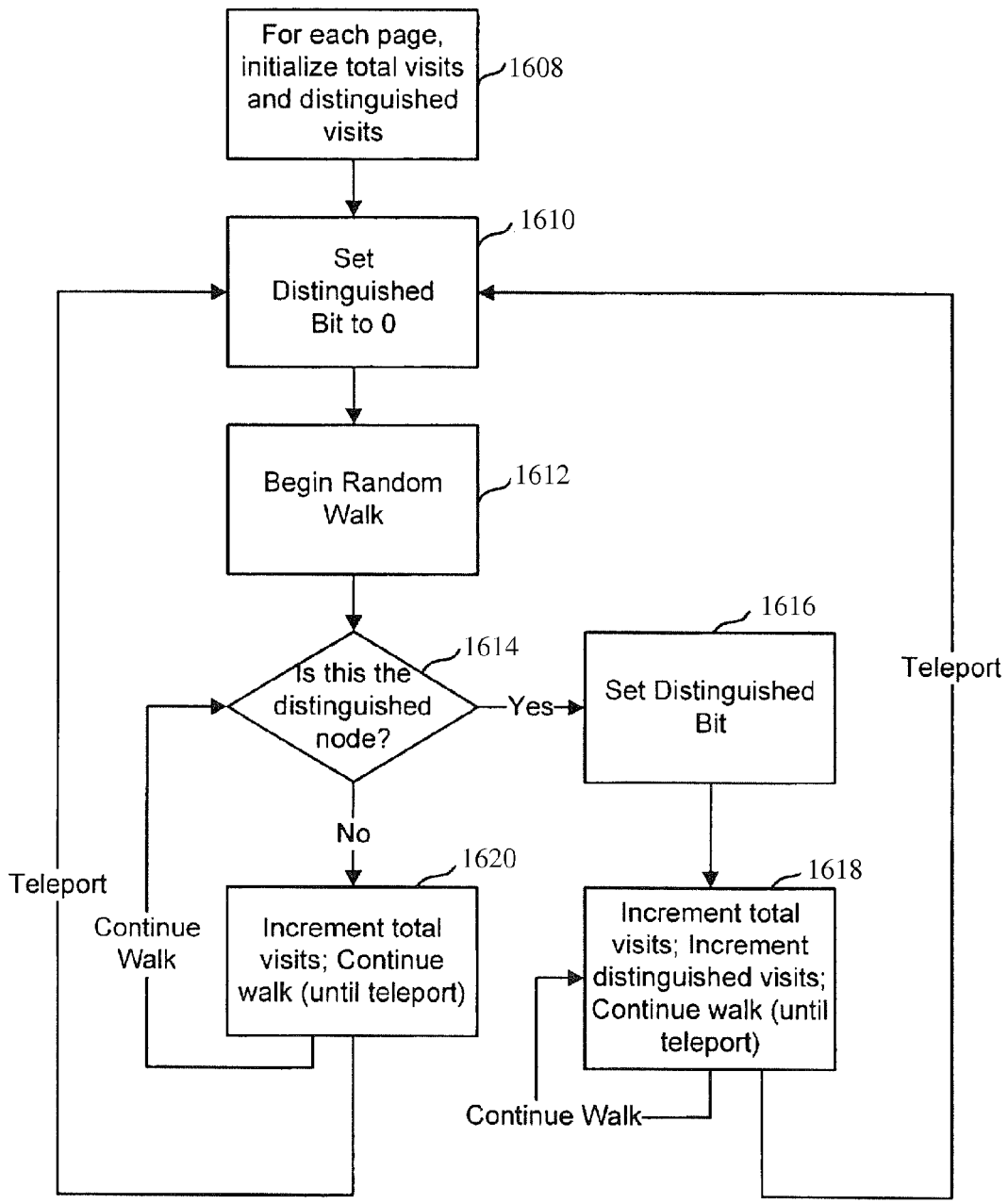
FIG. 16B illustrates a simplified embodiment of a portion of a process for determining the relevance of a document.

FIG. 16B illustrates a simplified embodiment of a portion of a process for determining the relevance of a document. The process depicted in FIG. 16B could be an example of an implementation of portions 1602 and 1604 of FIG. 16A as applied to collection 1302.

A topic score for a destination page can be computed by "counting" the number of times that a distinguished page was encountered before the destination page in a series of natural random walks.

In an example random walk, assume each web page has a total visit counter. Each time the random surfer visits the web page, he increments the page's total visit count by 1. Now assume that the random surfer can carry finite state information along while performing random walks. For example, suppose the random surfer carries around the Boolean variable "Visited_F". The value is initially set to 0. When the random surfer visits a page F, the variable is set to 1. When the random surfer teleports, his states (such as the Visited_F variable) are reset to 0. In this example, page F is a distinguished node.

Each web page has one or more additional counters, such as a counter $Count_F$. When the random surfer visits the web page, he updates the page's counters appropriately based on his state information. In some embodiments, rather than having counts increment by the same value (e.g., 1), the increment values are based at least in part on the distance between the distinguished page and the current page.

One method of updating a page's counters is given below in the following pseudocode:

```
/* on visiting Web Page X */
    /* increment the Link Score Counter */
    Total _Visits(X)++;
    /* do distinguished visit logic (F is a distinguished node) */
    If (X == F) {
        Visited_F =1;
    }
    If (Visited_F){
        CountF(X)++;
    }
/* on teleport */
    Visited_F =0;
```

Based on the above pseudocode, the Page Rank of a web page X can be written as follows:

$$P(X) = \frac{Count(X)}{\sum_{i \in Web} Count(i)} \quad (14)$$

The topic score of page X in the topic F can be written as follows:

$$P_F(X) = \frac{Count_F(X)}{\sum_{i \in Web} Count_F(i)} \quad (15)$$

In the example shown, the process begins at 1608 when, for each document in collection 1302, a total visit count and a distinguished visit count are initialized. In this example, a single distinguished page is tracked. As described in more detail below, in some embodiments, multiple pages may be distinguished, and the process is modified accordingly.

One method of initializing the counts is to set both values to 0 for all pages in collection 1302. In some embodiments, other methods are used for initialization, such as by setting specific values for particular pages.

At 1610, the distinguished bit, which tracks whether or not a surfer has visited the distinguished node, is set to 0, indicating that the distinguished node has not yet been visited.

At 1612, a random walk is begun. If an encountered page is the distinguished node (1614), at 1616, the distinguished bit is set, for example to 1. Additionally, the total visits counter and the distinguished visits counters of the distinguished page are incremented (1618). The random walk continues and each subsequently encountered page has its total visit counter and distinguished page counter incremented, until teleport occurs. Upon teleport, the random surfer's distinguished bit is reset to 0 (1610) and a new random walk is begun (1612).

During the random walk, until the distinguished node is visited (1614), each visited page has its total number of visits counter incremented (1620), but does not have its distinguished page counter incremented. In this example, the process terminates when convergence is reached (not shown).

The methods presented in conjunction with FIG. 16B are given in part to help conceptualize a process for computing the relevance of a page. While the equations presented can be used to compute relevance, to do so would require, for each page p, a very large number of computations, especially when collection 1302 is large. As described more fully below, in some embodiments, more efficient processes are employed to calculate scores.

A simplified numeric example of an iterative version of the process shown in FIG. 16B is given in FIGS. 17A-17D to help illustrate the process conceptually. For simplicity of illustration, the values given in FIGS. 17A-17D are not normalized to maintain unity.

Figure 17A:
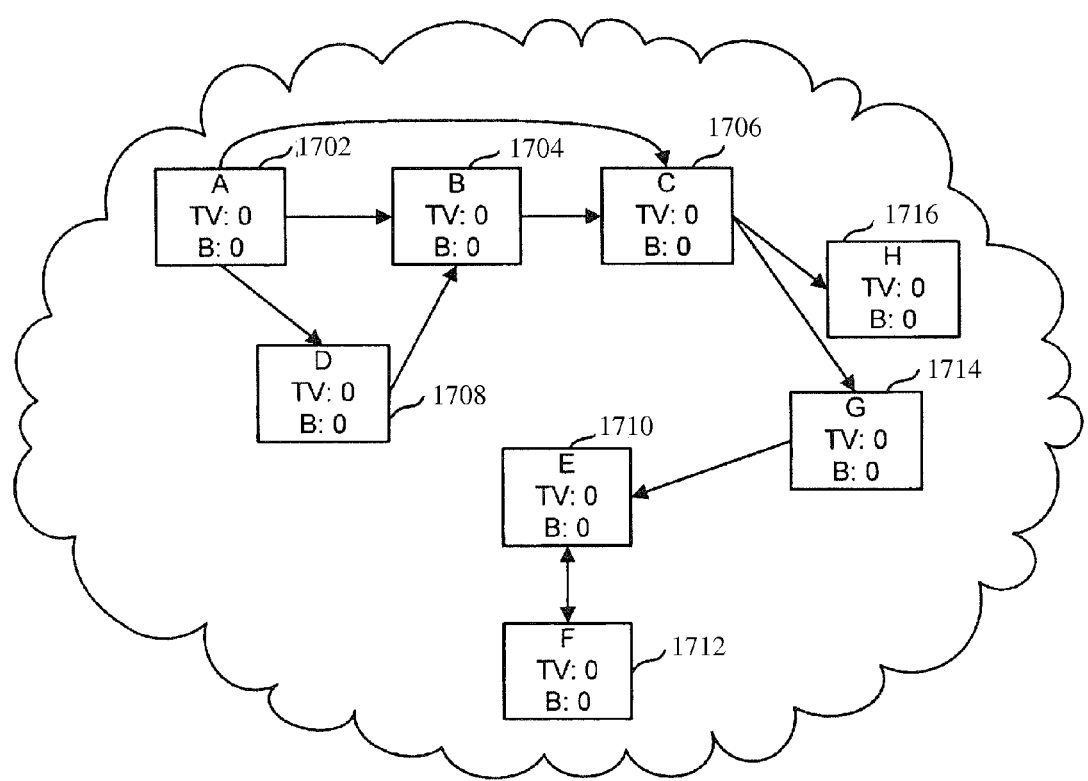
FIG. 17A illustrates a simplified embodiment of a portion of a process for assigning scores to a collection of documents.

FIG. 17A illustrates a simplified embodiment of a portion of a process for assigning scores to a collection of documents. The process depicted in FIG. 17A could be an example of an implementation of portion 1608 of FIG. 16B as applied to collection 1302. In the example shown, nodes A-H (1702-1716) are included in collection 1302. Node B is a distinguished node. Their total visit counts (represented here as "TV"), and their visits that were preceded by a visit to the distinguished node (represented here as "B") are initialized to 0.

Figure 17B:
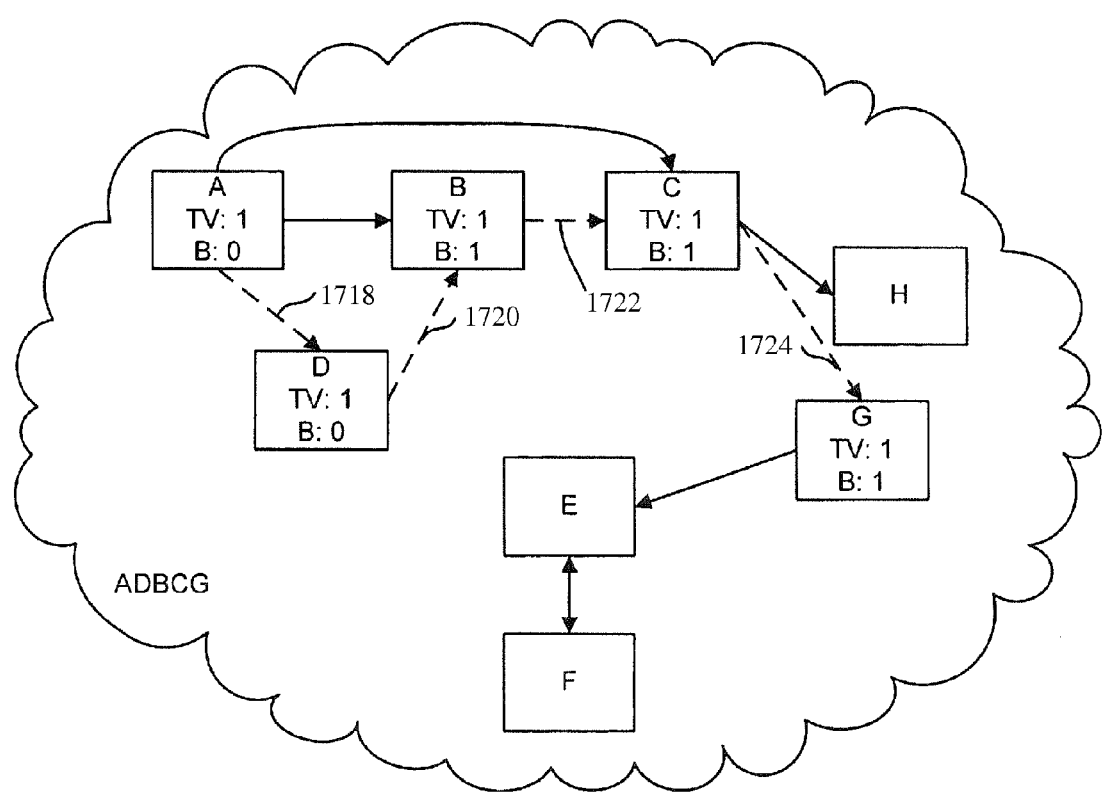
FIG. 17B illustrates a simplified embodiment of a portion of a process for assigning scores to a collection of documents.

FIG. 17B illustrates a simplified embodiment of a portion of a process for assigning scores to a collection of documents. The process depicted in FIG. 17B could be an example of an implementation of portions 1610-1618 of FIG. 16B. The distinguished bit is set to 0 (not shown). A random walk beginning at node A is performed (represented herein as a dashed line). Since node A is not the distinguished node, only its total visit counter is incremented. The second page in the random walk is node D (1718). Node D's total visit count is incremented, but its B count is not, because the random surfer has not yet visited node B. The third page in the walk is node B, the distinguished node (1720). Both of node B's counters are incremented. The fourth page visited in the walk is node C (1722). Both of node C's counters are incremented. The fifth page visited in the walk is node G (1716). Both of node G's counters are incremented.

Figure 17C:
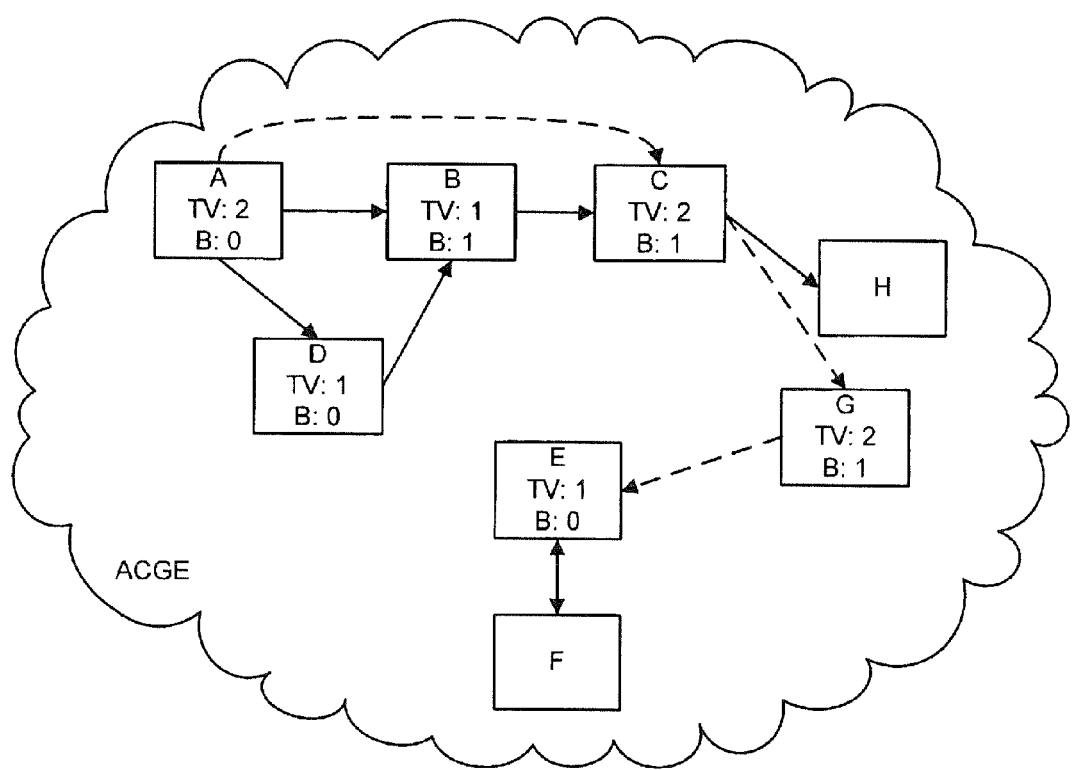
FIG. 17C illustrates a simplified embodiment of a portion of a process for assigning scores to a collection of documents.

FIG. 17C illustrates a simplified embodiment of a portion of a process for assigning scores to a collection of documents. The process depicted in FIG. 17C could be an example of an implementation of portions 1610-1618 of FIG. 16C. After teleporting, the distinguished bit is again set to 0 (not shown). In the random walk shown, the distinguished page, node B, is not encountered before teleport. Thus, each visited page has its total visit counter incremented, but not its B counter.

Figure 17D:
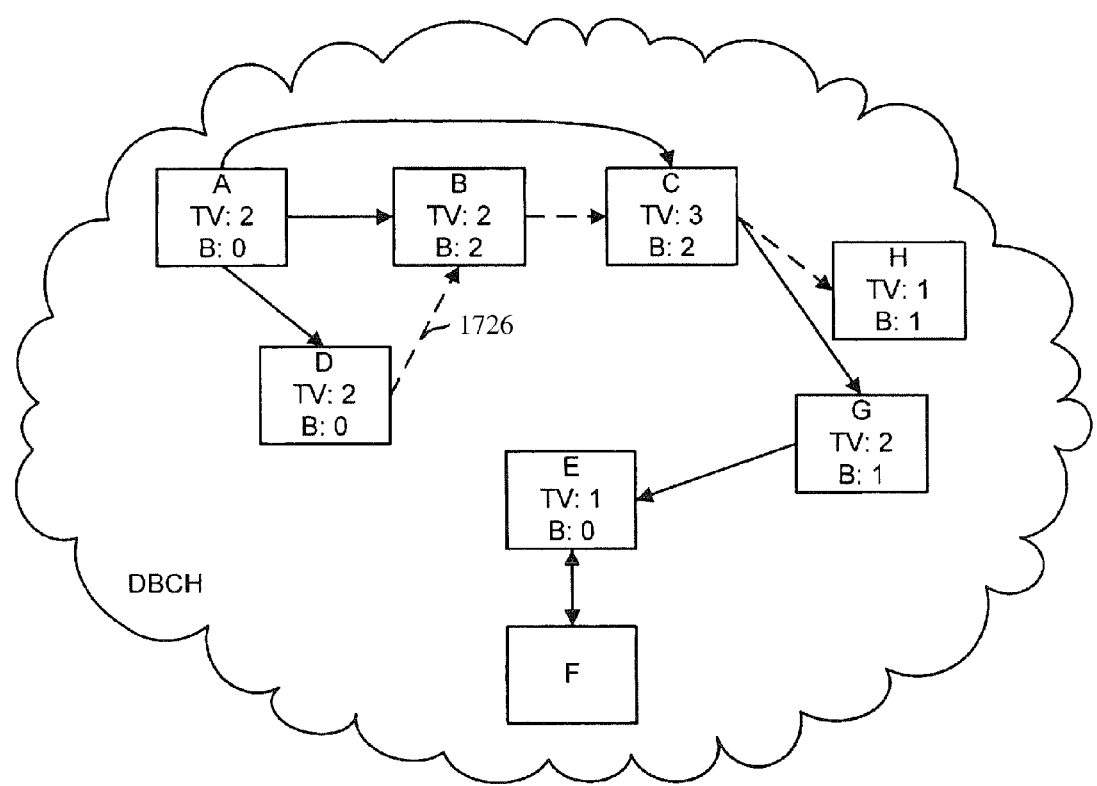
FIG. 17D illustrates a simplified embodiment of a portion of a process for assigning scores to a collection of documents.

FIG. 17D illustrates a simplified embodiment of a portion of a process for assigning scores to a collection of documents. The process depicted in FIG. 17D could be an example of an implementation of portions 1710-1718 of FIG. 16C. After teleporting, the distinguished bit is again set to 0 (not shown). In the random walk shown (this time beginning at node D), page B is encountered as the second page in the walk (1726). Thus, node D has only its total visit counter incremented, while nodes B, C, and H have both counters incremented.

After the processing of FIG. 17D, the following basic relevance has been determined. Node A has a relevance score is 0, or 0 divided by 2. The same holds true for Node D, which has the same score. Node B has a relevance score is 1 (1 divided by 1). Node C has a relevance score of 0.666, or 2 divided by 3. The scores of the other nodes in FIG. 17D can be similarly computed. These scores indicate the percentage of traffic (in the sense of number of visits, not kilobytes) that each node received via node B.

Typically, if one page links to another, it indicates that there is something in common between the two pages. For example, a page containing general information about the sport of football may link to team sites. Similarly, a team page may link to ticket sales, to local information about the city in which the team resides, or to television schedules. However, in some cases, the only commonality between pages in the same natural random walk is that they are in close proximity to each other.

For example, a page containing a salad recipe may link to the restaurant in which the page author first tried such a salad. The restaurant page may in turn link to the page of an artist, whose works are displayed on the restaurant walls. It is possible that a fairly large amount of traffic may flow from the salad recipe page to the artist's page, for example, if the recipe site is well known. Nonetheless, the two pages, one for a salad recipe, and one for a portrait painter, have effectively little to do with each other.

In a random walk R, consider a page X that appears often after F and so has a high topic score. Page X can also appear often, in general, whether or not F precedes it. Page X may thus have little to do with F, outside of the fact that it is "close" to F. A topic score is thus a measure of proximity to F and popularity, not necessarily the relevance to the topic.

For the same two pages X and F, a question can be asked: What is the confidence that X→F? If X appears in a natural random walk, what is the probability that it is preceded by F? If this probability, $P(X \to F)$, is large, F appears most of the time X appears. Page X can be seen as a captive of F—since it can only be reached through F, its only purpose is to serve F, and so it must be highly relevant to F. Based on the standard random surfer:

$$P(X \to F) = \frac{\text{Count}_F(X)}{\text{Count}(X)} \qquad (16)$$

The ratio of the topic score of X in F to the link score of X can be referred to as $\Delta_F(X)$. The relevance of a page X to a topic F, denoted by $\text{Rel}_F(X)$ can be given as:

$$\text{Rel}_F(X) = P(X \to F) = \frac{\Delta_F(X)}{\Delta_F(F)} \qquad (17)$$

The above formulation is independent of the teleportation probability, the memoryless nature of the random walk, etc.

If the natural random walks are viewed as a collection of strings, the result above holds for any collection of strings. The set of strings that can appear as natural random walks is the same as those accepted by the web graph viewed as a finite state automaton (FSA) constructed as follows: Add a new node T that represents teleport to the web graph FSA. Node T has edges to and from every other node in the web graph.

Here, every edge is labeled with the destination page's symbol. Thus edge (x,y) has the label y. Node T is the start state and also the success state. The set of strings accepted by this FSA is identical to the set of strings that are the natural random walks on the web graph. In some embodiments, the Markovian world is used to model the frequency of occurrence.

Topic relevance is a probability measure and so has a value between 0 and 1. Thus it should be the case that for all X, $\Delta_F(F) \geq \Delta_F(X)$.

Consider a topic defined by page F, and a given page X, where X is different from F. As determined previously, $$\Delta_F(X) = \frac{P_F(X)}{P(X)}.$$

The Page Rank of X can be defined in terms of X's neighbors:

$$P(X) = \beta \times \sum_{Y \text{ neighbor of } X} \frac{P(Y)}{O(Y)} + \frac{(1-\beta)}{N} \quad (18)$$

Where $1-\beta$ is the teleport probability, O(Y) is the number of outlinks of Y, and N is the number of pages in the web graph. In some embodiments, if the Page Rank of X is much larger than the incoming teleportation probability (a fixed number), the contribution of teleportation can be ignored and the equation can be rewritten as:

$$P(X) = \beta \times \sum_{Y \text{ neighbor of } X} \frac{P(Y)}{O(Y)} \quad (19)$$

Consider now the topic rank of X. Since the random walks are memoryless, the topic rank of X in both cases is the same, if the topic is defined as a single page, as is the case in this example. Given that X is different from F, there is no teleportation to X in the topic definition, thus:

$$P_F(X) = \beta \times \sum_{Y \text{ neighbor of } X} \frac{P_F(Y)}{O(Y)} \quad (20)$$

Now:

$$\Delta_F(X) = \frac{\sum_{Y \text{ neighbor of } X} \frac{P_F(Y)}{O(Y)}}{\sum_{Y \text{ neighbor of } X} \frac{P(Y)}{O(Y)}} \quad (21)$$

The "Effective Page Rank" of a page Y, denoted as Q(Y), can be defined as:

$$Q(Y) = \frac{P(Y)}{O(Y)} \quad (22)$$

Now, $$\Delta_F(X) = \sum_{Y \text{ neighbor of } X} \frac{Q(Y)}{\sum_{Z \text{ neighbor of } X} Q(Z)} \times \Delta_F(Y) \quad (23)$$

Thus, $\Delta_F(X)$ is the weighted-average of the deltas of all X's neighbors, where the weights are the effective Page Ranks of the neighbors.

A Web Page with a high effective Page Rank is generally more influential in propagating its delta than a page with a low effective Page Rank. Thus, in some embodiments, the seed set includes pages with a high effective Page Rank.

Topic drift can happen when a page with high effective Page Rank and low delta links to a page with a high topic rank. High effective Page Rank pages are topic arbiters, diffusing deltas through the Web Graph.

Topics can be defined using multiple web pages. For simplicity, consider a Topic "F+G" defined by two web pages F and G. Using the natural random walk framework, the topic rank of any page X in this topic F+G is the average of the topic rank of X in F and X in G.

In some embodiments, topics are defined as a property of the general random walk on the web graph, not by defining a new random walk. The notion of topic relevance is one outcome of taking this approach.

For single-page topics, the two approaches end up being the same. This is not the case for multi-page Topics.

First, consider the logic the random surfer adopts for multi-page Topics. For simplicity, assume a two-page Topic defined by pages F and G. The following pseudocode describes the rules that govern the random surfer:

/* do distinguished visit logic */
If ((X==F)||(X==G)){
Visited_FG=1;
}
If (Visited_FG){
Count$_{FG}$(X)++;
}
/* increment the Page Rank Counter */
Count(X)++;
/* on teleport */
Visited_F=0;

A topic rank of a page X in topic F+G can be given as:

$$P_{FG}(X) = \frac{\text{Count}_{FG}(X)}{\sum_{J \in Web} \text{Count}_{FG}(J)} \quad (24)$$

Assume that F and G are mutually exclusive (i.e., G never shows up in a natural random walk with F). This can be written as $P_F(G)=P_G(F)=0$. In this case:

$$P_{FG}(X) = \frac{\text{Count}_F(X) + \text{Count}_G(X)}{\sum_{J \in Web} \text{Count}_F(J)} + \sum_{J \in Web} \text{Count}_G J \quad (25)$$

It can be shown that:

$$\frac{\sum_{J \in Web} \text{Count}_F(J)}{\sum_{J \in Web} \text{Count}_G(J)} = \frac{\Delta_G(G)}{\Delta_F(F)} \quad (26)$$

The inverse of $\Delta$ is denoted here by $\Delta^*$. That is, $$\Delta_F^*(F) = \frac{1}{\Delta_F(F)}.$$

Based on the above equations, $$P_{FG}(X) = \frac{\Delta_F^*(F)}{\Delta_F^*(F) + \Delta_G^*(G)} \times P_F(X) + \frac{\Delta_G^*(G)}{\Delta_F^*(F) + \Delta_G^*(G)} \times P_G(X) \quad (27)$$

In some embodiments, in a multi-page topic, if it is assumed the pages defining the topics are mutually exclusive in the natural random walks, then the topic rank is the weighted average of the topic rank in the corresponding single-page topics. The weights are the corresponding $\Delta^*$s.

The weights for each single-page topic score can be based on its corresponding $\Delta^*$ for it to correspond to a property of the original Random Walk.

If the pages that define the topic are not mutually exclusive, the computation is made more complex. The natural random walks in which F and G both occur will be double counted if the above analysis is used.

Assume F, G, and X, occur exactly once in a natural random walk. It can be shown that the average number of occurrences of any page Y in a natural random walk, given that Y appears at least once, is given by:

$$\frac{P_Y(Y)}{(1-\beta)}.$$

In some embodiments, the X's that are double-counted are backed out. Page X will be double counted where there is both an F and a G preceding the X. The number of X's in the F→G→X sequence is given by: $\text{Count}_A(B) \times P_B(X)$. Similarly, for G→F→X.

For the denominator, sequences of the form F→G→T (teleport) are double counted. Every page in the sub-sequence G→T is double counted. Given that G has occurred, the average number of web pages in G→T is $$\frac{1}{(1-\beta)}.$$

This is similar for sequences of the form G→F→T.

$P_{FG}(X)$ can be written as follows:

$$P_{FG}(X) = \frac{\Delta_F^*(F) \times P_F(X) + \Delta_G^*(G) \times P_G(X) - \Delta_F^*(F) \times P_F(G) \times P_G(X) - \Delta_G^*(G) \times P_G(F) \times P_F(X)}{\Delta_F^*(F) + \Delta_G^*(G) - \frac{\Delta_F^*(F) \times P_F(G)}{(1-\beta)} - \frac{\Delta_G^*(G) \times P_G(F)}{(1-\beta)}} \quad (28)$$

Given a web page X, for all possible topics F, give the confidence and support that X belongs to F. In this example, assume that topics are defined by a single web page. For example, consider only those natural random walks where X appears. One way to find the set of pages F that consistently precede X in these natural random walks is to first focus on topic relevance. If when X appears in a natural random walk it is preceded by F with high probability, then X→F. Now, given X, what are the Fs that precede it with high probability?

One way to solve this problem is to create a dual web graph. The nodes of the dual web graph are the web pages, just like in the original web page. However, the directionality of all links in the original web graph are inverted. Thus all inlinks in the original web graph are now outlinks in the dual web graph and vice versa. The random walk on this dual web graph can be denoted by $R^D$.

One property satisfied by $R^D$ is that every natural random walk that appears in R appears reversed in $R^D$, and the same number of times. $R^D$ preserves Page Rank. This property in Markov Chains is called "reversibility". If the natural random walks are strings, in the dual, all of the strings are reversed. R and $R^D$ are said to be reversible, if and only if:

$$P(j) \times \pi(j,k) = P^D(k) \times \pi^D(k,j) \quad (29)$$

Here, P(j) is the Page Rank of j, $P^D(k)$ is the Page Rank of k in the Dual Web Graph, and $\pi(j,k)$ is the probability that edge (j,k) is followed. When R and $R^D$ are reversible, by definition $P^D(k)=P(k)$. Thus:

$$P(j) \times \pi(j,k) = P(k) \times \pi^D(k,j) \quad (30)$$

The transition probabilities in the dual web graph, $\pi^D(k,j)$ can be defined as follows:

$$\pi^D(k, j) = \frac{\beta \times P(j)}{O(j) \times P(k)} \quad (31)$$

where O(j) is the number of outlinks of j. All the outbound probabilities (including teleportation) from a page sum to 1:

$$\sum_{1 \text{ neighbor of } k} \pi_D(k, 1) + T_O^D(k) = 1 \quad (32)$$

Here, $T_O^D(k)$ is the probability of teleportation out of k in the dual web graph. Teleportation is defined differently in the dual web graph:

$$T_O^D(k) = \frac{(1-\beta)}{(N \times P(k))} \quad (33)$$

Teleportation is more likely out of lower Page Rank nodes in $R^D$. If all pages have equi-probability $$\frac{1}{N},$$

then the outbound teleportation probability becomes what is seen in the standard Page Rank algorithm.

To determine $T_I^D(k)$, the teleportation probability into page k. consider P(k) in the dual web graph:

$$P(k) = \sum_{1 \text{ neighbor of } k} P(1) \times \pi^D(1, k) + T_I^D(k) \quad (34)$$

Substituting for $\pi^D(1,k)$:

$$T_I^D(k) = (1-\beta) \times P(k) \quad (35)$$

Teleportation in the dual web graph thus behaves as follows: teleport occurs out of any page k with probability:

$$\frac{(1-\beta)}{(N \times P(k))}.$$

once teleportation out occurs, teleportation into any page j on the web can occur with probability proportional to its Page Rank P(j). The probability of teleport, across all pages, just as with the original web graph is $(1-\beta)$.

FIG. 18 is a table illustrating properties of walks. Assuming the probability of teleport into any page is proportional to its Page Rank, the desired incoming teleport probability for the page can be obtained.

Given a page X, for every possible topic (e.g., page) F on the web, what is $P_F(X)$ and $Rel_F(X)$? Given a topic page F, the topic rank and the topic relevance for every Page can be computed based on this topic F.

Given any page X, it is possible to find its topic score and topic relevance for every possible topic F. Consider A, an N×N matrix, where $A[j,k]=Rel_k(j)$. Here, topics (as defined by web pages) are the columns and web pages are the rows. The diagonal of this matrix is 1 (since $Rel_k(k)=1$). A is an N×N matrix since in this example every web page also defines a topic. The dual random walk can be used to determine the values of all elements in a given row of the matrix.

For the analysis below, assume that no page appears more than once in any natural random walk. Example identities between the regular random walk and the dual random walk follow. $P(X)=P^D(X)$ (Page Rank is conserved). Thus, Count $(X)=Count^D(X)$. By reversing strings the number of times any symbol appears does not change.

The number of regular natural random walks in which F appears followed by X is the same as the number of dual natural random walks in which X appears followed by F. Further, since no page appears more than once in a natural random walk (regular or dual): $Count_F(X)=Count_X^D(F)$.

Example: Consider the Natural Random Walks (strings): FCX, XF, CD. Here, the Dual Random Walks are the reverse: XCF, FX, DC. Now, $Count_F(X)=1$ (only in string FCX does F precede X). And, $Count_X^D(F)=1$ (only in string XCF does X precede F).

Consider now the identity: $Count_F(X)=Count_X^D(F)$;

$$\frac{Count_F(X)}{Count(X)} = \frac{Count_X^D(F)}{Count^D(X)}.$$

$$\text{Thus, } Rel_F(X) = \frac{Count_X^D(F)}{\sum_{i \in Web} Count_X(i)} \times \frac{\sum_{i \in Web} Count_X(i)}{Count^D(X)}.$$

Since $Count^D(X)=Count_X^D(X)$, $$Rel_F(X) = \frac{P_X^D(F)}{P_X^D(X)} \quad (36)$$

The topic relevance of X in topic F is proportional to the topic rank of F in topic X in the dual web graph. One way of computing the topic relevance of X in every topic on the web is as follows: First, construct the dual web graph as given in the previous section. Next, select web page X as the topic. Next, compute the topic ranks of every web page for topic X in the dual web graph using the standard method of computing topic ranks. Finally, apply the formula above to get the topic relevance of X in every topic.

Now, consider the Dual Web Graph, and consider in particular: $Rel_F^D(X)$. In some embodiments, the above formula is used, noting that the dual of the dual web graph is the regular web graph. Thus:

$$\frac{P_X(F)}{P_X(X)} \quad (37)$$

The topic rank of X in all topics F can thus be computed by computing the topic relevance of F in topic X in the dual web graph.

Figure 19:
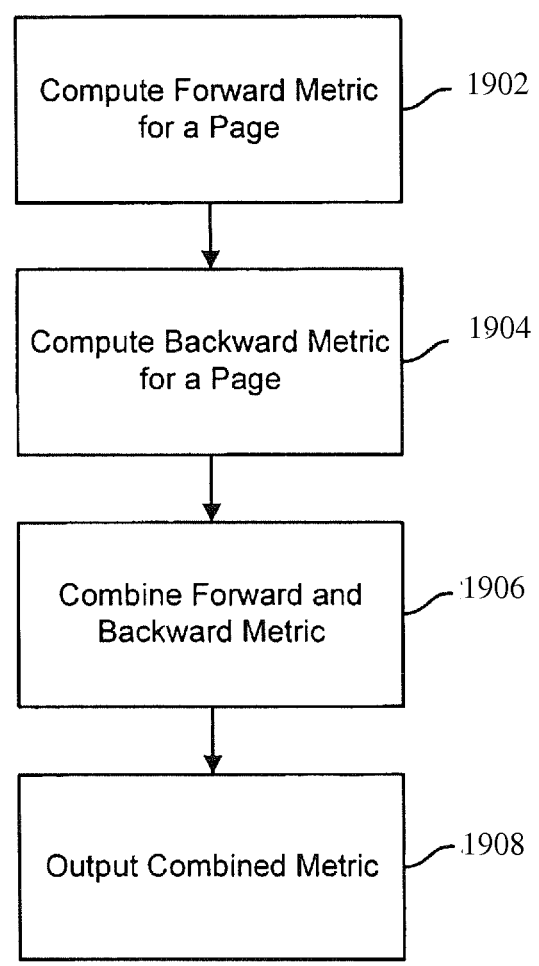
FIG. 19 is illustrates an embodiment of a process for scoring a document.

FIG. 19 is illustrates an embodiment of a process for scoring a document. The process may be implemented in link analysis engine 1308. The process begins at 1902 when a forward metric, such as the topic relevance of F in topic X is computed in usual manner. At 1904, the metric is computed in the dual graph. At 1906, the forward and backward metrics are combined. The metrics may be combined in a variety of ways. For example, a product of the metrics may be taken. The metrics may also be weighted—for example, with the forward metric weighted more than the backward metric. The process ends at 1908 when the combined metrics are outputted, for example, into a relation.

Consider creating an Oakland Raiders topic. The Oakland Raiders website appears like the right page to use to define this topic. Unfortunately, the site is not much of a hub page—it has few outlinks and is more of an "authority" page—one that hubs point to.

In general, a Web Page has both Hub and Authority components. In the formulations above, topic computations are hub-based. However, authority web pages can also be used.

Given a Web Page F that defines the Topic, and any page X, an authority topic rank $(P_F^A(X))$ and authority topic relevance $(Rel_F^A(X))$ can be defined as follows. Here, the superscript A and H to refer to Authority and Hub variants respectively. A topic notation without a superscript is assumed to involve hubs:

$$P_F^A(X)=Rel_X^H(F)=Rel_X(F) \quad (38)$$

$$Rel_F^A(X)=P_X^H(F)=P_X(F) \quad (39)$$

Consider the topic web page F and the random surfer. Assume the random surfer has a Visited_j variable for every web page J. If for any web page X, $Count_X(F)$ (the number of visits to F that were preceded by a visit to X), is a significant fraction of Count(F) (the total number of visits to F), X is a significant source of traffic to F. This is a popularity metric—while X may account for a lot of F's traffic, X may just be a general high-traffic site and may not be particularly relevant to F. A measure of topic relevance is needed: if a random surfer visits X, with high probability he visits F, which is given by the hub topic rank of F in X.

In some embodiments, the authority topic rank and relevance of any page X for a given topic F are the same (within a constant factor) as the hub topic rank and relevance of the page X in topic F in the dual web graph. The constant factor can be derived by approximating $P_X(X)$ by $(1-\beta)$—the probability of teleport.

When there is a page for which a topic is to be computed, both hub and authority topics can be computed and the scores combined appropriately when search results are ranked.

Topic relevance can be computed with respect to seed sets of any size. Instead of stating the definition of topic relevance in terms of a single random walker, a large collection of random walkers can be employed.

Suppose a web graph has N nodes. Hypothetical random surfers pursue random walks on the web with a teleport parameter β (i.e., the probability of teleport at each step is 1−β). Suppose that the number M of such random walkers is very large, i.e., M>>N and the random walks have settled to equilibrium distributions.

The Page Rank of a page p is the fraction of the total number of random walkers that are on p at any point in time. Using r to denote the Page Rank vector, and r(p) to denote the Page Rank of page p, suppose the number of random surfers at page p is M(p). Then, $$r(p) = \frac{M(p)}{M} \quad (40)$$

Now suppose a set S of seed pages is selected for a topic. In some embodiments, each random surfer is in one of two states: relevant and irrelevant. Here, each surfer is initially in the irrelevant state. When a surfer visits a seed set page, his state changes to relevant (independent of his prior state). These surfers are referred to herein as relevant surfers. When a surfer teleports at random, his state changes to irrelevant. These surfers are referred to herein as irrelevant surfers.

At any time t, the number of relevant surfers at node p can be denoted as $M_R(p)$. The relevance of p is the fraction of the surfers at p who are relevant. The relevance vector is denoted x and the relevance of p is denoted x(p). Then:

$$x(p) = \frac{M_R(p)}{M(p)} \quad (41)$$

If p∈S, then $M_R(p)=M(p)$, and so x(p)=1.

Of these random surfers, let M'(p) denote the number that got to b by following a link (i.e., those that did not teleport directly to p). The non-teleport Page Rank (NTPR) of p, denoted r'(p) can be defined as:

$$r'(p) = \frac{M'(p)}{M}$$

Figure 20:
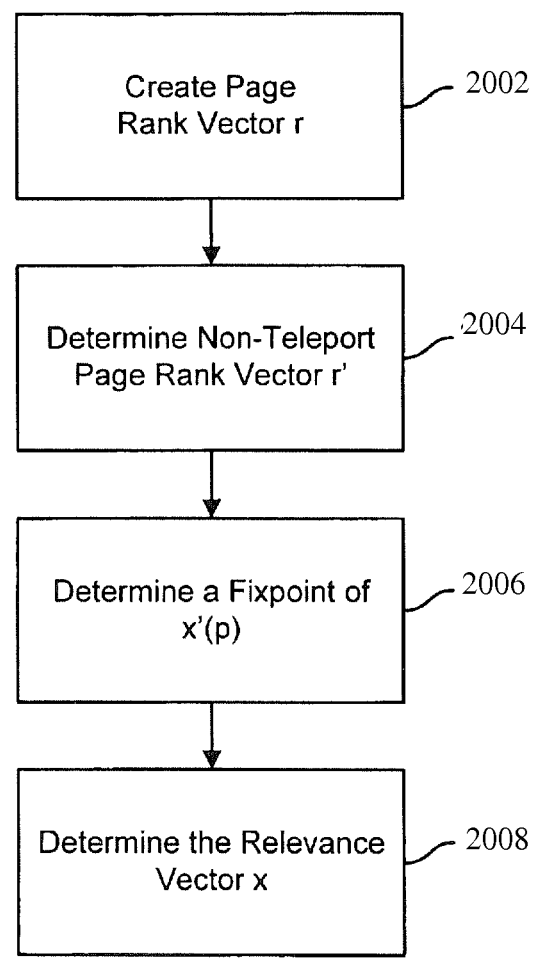
FIG. 20 illustrates an embodiment of a process for determining a relevance vector.

FIG. 20 illustrates an embodiment of a process for determining a relevance vector. This process may be implemented in link analysis engine 1308. In the example shown, the process begins at 802 when a typical Page Rank vector r is determined.

At 2004, a non-teleport Page Rank vector r' is determined. There is a relationship between r and r'. Since there are M random surfers, at any time step (1−β)M teleport. Since the teleports are uniformly at random, the number of surfers who teleport into p at any time step is $$(1-\beta)\frac{M}{N}.$$

Therefore:

$$M'(p) = M(p) - \frac{1-\beta}{N}M \quad (43)$$

And thus, the following is one way of determining the NTTP:

$$r'(p) = r(p) - \frac{1-\beta}{N} \quad (44)$$

The non-teleport topic relevance (NTTR) of p, denoted by x'(p) can be defined as follows:

$$x'(p) = \frac{M_R(p)}{M'(p)} \quad (45)$$

In this example, if p∈S, $M_R(p)=M(p)>M'(p)$, and so x'(p)>1. The following formula relates x(p) and x'(p):

$$x'(p) = \frac{M_R(p)}{M'(p)} \quad (46)$$

$$= \frac{M_R(p)}{M(p) - \frac{1-\beta}{N}M}$$

This can be simplified, noting that $$\frac{M}{M(P)} = \frac{1}{r(p)},$$

as follows:

$$x(p) = \left(1 - \frac{1-\beta}{Nr(p)}\right)x'(p) \quad (47)$$

A recursive formula can be derived that relates the NTTR of a node to that of its neighbors. This formula can be used as the basis of a graph computation for NTTR.

Consider the relevant surfers at page p∉S at time t+1. The number of surfers at p is M(p), and the number of relevant surfers is $M_R(p)=x'(p)M'(p)$. The in neighbors and out-neighbors of p can be denoted I(p) and O(p), respectively. In this example, each of these surfers came from an inneighbor of p. Suppose q∈I(p). At time t, the number of random surfers at q is M(q), and the number of relevant random surfers is $M_R(q)=x'(q)M'(q)$. Of these relevant surfers, a fraction β follows outlinks and a fraction 1−β teleports out of q. The number of relevant surfers from q that land up at p at time t+1 is therefore $$\frac{\beta}{|O(q)|}M_R(q) = \frac{\beta}{|O(q)|}x'(q)M'(q).$$

Thus, at equilibrium:

$$x'(p)M'(p) = \sum_{q \in I(p)} \frac{\beta}{|O(q)|} x'(q)M'(q) \qquad (48)$$

Dividing through by M, and using $$r'(p) = \frac{M'(p)}{M},$$

this can be rewritten as:

$$x'(p)r'(p) = \sum_{q \in I(p)} \frac{\beta}{|O(q)|} x'(q)r'(q) \qquad (49)$$

It was previously assumed that $p \notin S$. If $p \in S$, then $x(p)$ is 1. Thus, the following recursive formula for $x'(p)$ can be given:

$$x'(p) = \begin{cases} \dfrac{1}{1 - \dfrac{1-\beta}{Nr(p)}} & \text{if } p \in S \\ \dfrac{1}{r'(p)} \sum_{q \in I(p)} \dfrac{\beta}{|O(q)|} x'(q) r'(q) & \text{if } p \notin S \end{cases} \qquad (50)$$

At 2006, a link-based graph computation is used to compute a fixpoint for the recursive equation given above. In some embodiments, pages in the set S are initialized to non-zero values, and the other nodes are initialized to 0.

At 808, the relevance vector x is computed, for example, using $$x(p) = \left(1 - \frac{1-\beta}{Nr(p)}\right) x'(p)$$

as described above.

A matrix equation for NTTR can be used. Define an N×N matrix R and N×1 vector $x_0'$ as follows:

$$R_{pq} = \begin{cases} \dfrac{\beta}{|O(q)|} \dfrac{r'(q)}{r'(p)} & \text{if } p \in S \text{ and } q \in I(p) \\ 0 & \text{otherwise} \end{cases} \qquad (51)$$

$$x_0'(p) = \begin{cases} \dfrac{1}{1 - \dfrac{1-\beta}{Nr(p)}} & \text{if } p \in S \\ 0 & \text{otherwise} \end{cases}$$

The recursive formula previously given (Eq. 14) can be rewritten as the following linear matrix equation (a Sylvester Equation):

$$x' = Rx' + x_0' \qquad (52)$$

In this example, the matrix R is not stochastic, unlike the corresponding matrix A in the Page Rank equation. Correspondingly, relevance vector x' is also not a probability vector.

Multiple topics can be organized into a topic hierarchy. For example, a topic hierarchy can be implemented in a tree or a DAG, with the children of a node (e.g., football, basketball), being subtopics of the parent (e.g., sports). As described in more detail below, the relevance of each page with respect to each topic in the hierarchy can be computed.

"Children's health" is an example subtopic of "health." Consider a search, such as "music," in the context of children's health. In some cases, high on the results list might be pages about music as it relates to general health. This is because pages that are relevant to general health may also obtain good relevance scores for children's health, due to topic drift.

Hierarchical topic relevance can be used to minimize topic drift by taking advantage of information encoded in the topic hierarchy.

Suppose a web graph has N nodes and there are a large number of random surfers pursuing random walks on the web, with teleport parameter $\beta$ (i.e., probability of teleport at each step is $1-\beta$). Suppose that the number M of such random walkers is very large, i.e., M>>N, and the random walks have settled to equilibrium.

The typical Page Rank of a page p is the fraction of the total number of random walkers that are on p at any point in time. Using r to denote the Page Rank vector, and r(p) to denote the Page Rank of page p, suppose the number of random surfers at page p is M(p). Then:

$$r(p) = \frac{M(p)}{M} \qquad (53)$$

Suppose there is a topic hierarchy H, organized as a tree or as a DAG. In this example, there is a seed set of pages associated with every topic T in the hierarchy. Here, the seed set for a topic includes the seed sets of all of its subtopics, but may contain additional pages that are not in the seed sets of any of its subtopics. A pair of topics in this example is said to be unrelated if neither is an ancestor or descendant of the other. In other cases, these assumptions are not strictly adhered to. For example, other seed sets may be used as applicable.

Consider some topic T in H, and denote its seed set by S(T). Associated with each topic is also an excluded set of pages, which is denoted by E(T). In this case, the excluded set contains pages that are known not to belong to topic T. One way to construct E(T) is to set it equal to the union of the seed sets of all the topics in the hierarchy that are not subtopics of T (in particular, E(T)) includes the seed sets of the ancestors of T). Here, generically popular pages, such as Yahoo.com and Google.com are included in the seed set of the root of the hierarchy.

Suppose that each random surfer is in one of two states: relevant, and irrelevant. Initially, each surfer is in the irrelevant state. In some embodiments, surfers follow the following rules. When a surfer visits a seed set page, his state changes to relevant (independent of his prior state). These surfers are referred to herein as relevant surfers. When a surfer teleports at random, his state changes to irrelevant. These surfers are referred to herein as irrelevant surfers. When a surfer visits an excluded page, his state changes to irrelevant.

At any time t, let $M_R(p)$ denote the number of relevant surfers at node p. the relevance of p is the fraction of the surfers at p who are relevant. The relevance vector is denoted here by x and the relevance of p is denoted by x(p). Then:

$$x(p) = \frac{M_R(p)}{M(p)} \quad (54)$$

If $p \in S(T)$, then $M_R(p) = M(p)$, and so $x(p)=1$. If $p \in E(T)$, then $x(p)=0$.

The iterative process described above can be modified to compute hierarchical topic relevance. One way this can be accomplished is by modifying the manner in which the excluded set is treated. The values for the excluded set can be pinned at 0 and not updated in the usual manner. At the 806 in this modified scheme, hierarchical topic relevance will have been computed.

Another approach is to estimate hierarchical relevance using the ordinary relevance. In the case where the excluded set contains a single page, a closed formula can be derived. In some embodiments, the matrix formulation of relevance is extended to incorporate excluded pages.

In some embodiments, instead of setting the relevance of the excluded pages to zero, set their relevance to a small non-zero value. A different value for each excluded page may be used, for example, depending on the relatedness of topics in the hierarchy.

In some embodiments, instead of (or in addition to) the excluded set, compute a value for each page that expresses its contribution to topic drift. This number may be measured in a manner similar to source scores in DIFR and will make relevance into a double-iterative algorithm like DIFR.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of delivering a search result comprising:
   receiving a query;
   identifying a first term in the query that is a first portion of a first abbreviation pair, wherein the first abbreviation pair includes a second portion;
   identifying a second term in the query;
   identifying a topic corresponding to the second term;
   identifying that the first term in the query is also present in a second abbreviation pair as a third portion of the second abbreviation pair, wherein the second abbreviation pair includes a fourth portion and wherein the fourth portion of the second abbreviation pair is different from the second portion of the first abbreviation pair;
   revising the query by selectively including as additional parameters in the query, one of:
   (1) the second portion,
   (2) the fourth portion, or
   (3) both the second and fourth portions,
   wherein the fourth portion comprises a plurality of terms representing an acronym expansion of the third portion and wherein the selection is based at least in part on a topical score associated with each of the second portion and the fourth portion, respectively, the topical scores corresponding to relevance of the second and fourth portions to the topic and calculated according to both of relevance of a plurality of constituent terms of the second portion and the plurality of terms of the fourth portion to the topic and relevance of the combined constituent terms of the second portion and the plurality of terms of the fourth portion to the topic, respectively;
   locating one or more search results for the revised query; and
   returning the one or more search results.

2. The method of claim 1 wherein the first portion is a short form included in the first abbreviation pair.

3. The method of claim 1 wherein the first portion is a long form included in the first abbreviation pair.

4. The method of claim 1 wherein the second portion is selected by a user.

5. The method of claim 1 wherein the second portion is determined based at least in part on a context associated with the query.

6. The method of claim 1 further comprising concatenating the received query with the second portion.

7. The method of claim 1 further comprising including the second portion in the received query as an OR term.

8. The method of claim 1 further comprising including the second portion in the received query as an AND term.

9. The method of claim 1 further comprising receiving an indication from a user that the second portion should be included in the received query.

10. The method of claim 1 wherein the received query is a first query and the second portion is included in second query that includes the first query.

11. The method of claim 1 wherein the returned result includes a visual indicator of occurrences of the first and second portions.

12. The method of claim 1 wherein a snippet associated with the result includes a visual indicator of occurrences of the first and second portions.

13. The method of claim 1 further comprising displaying an advertisement based at least in part on the second portion.

14. The method of claim 1 further comprising determining a first language associated with the query, determining that the second portion is associated with the first language, determining that the fourth portion is associated with a second language, and locating the one or more results based on the second portion and not on the fourth portion.

15. The method of claim 1 wherein the determining is based on a first and second expansion score associated with the first and second abbreviation pairs, respectively.

16. A system for delivering a search result, including:
   a processor; and
   a memory coupled with the processor, wherein the memory is configured to provide the processor with instructions which when executed cause the processor to:
   receive a query;
   identify a first term in the query that is a first portion of a first abbreviation pair, wherein the first abbreviation pair includes a second portion;
   identify a second term in the query;
   identify a topic corresponding to the second term;
   identify that the first term in the query is also present in a second abbreviation pair as a third portion of the second abbreviation pair, wherein the second abbreviation pair includes a fourth portion and wherein the fourth portion of the second abbreviation pair is different from the second portion of the first abbreviation pair;
   revise the query by selectively including as additional parameters in the query, one of:
   (1) the second portion,
   (2) the fourth portion, or
   (3) both the second and fourth portions, wherein the fourth portion comprises a plurality of terms representing an acronym expansion of the third portion and wherein the selection is based at least in part on a topical score associated with each of the second portion and the fourth portion, respectively, the topical scores corresponding to relevance of the second and fourth portions to the topic and calculated according to both of relevance of a plurality of constituent terms of the second portion and the plurality of terms the fourth portion to the topic and relevance of the combined constituent terms of the second portion and the plurality of terms of the fourth portion to the topic, respectively;

locate one or more search results for the revised query; and return the one or more results.

17. A computer program product for delivering a search result, the computer program product being embodied in a computer readable storage medium and comprising computer instructions for:

receiving a query;

identifying a first term in the query that is a first portion of a first abbreviation pair, wherein the first abbreviation pair includes a second portion;

identifying a second term in the query;

identifying a topic corresponding to the second term;

identifying that the first term in the query is also present in a second abbreviation pair as a third portion of the second abbreviation pair, wherein the second abbreviation pair includes a fourth portion and wherein the fourth portion of the second abbreviation pair is different from the second portion of the first abbreviation pair;

revising the query by selectively including as additional parameters in the query, one of:
(1) the second portion,
(2) the fourth portion, or
(3) both the second and fourth portions, wherein the fourth portion comprises a plurality of terms representing an acronym expansion of the third portion and wherein the selection is based at least in part on a topical score associated with each of the second portion and the fourth portion, respectively, the topical scores corresponding to relevance of the second and fourth portions to the topic and calculated according to both of relevance of a plurality of constituent terms of the second portion and the plurality of terms of the fourth portions to the topic and relevance of the combined constituent terms of the second portion and the plurality of terms of the fourth portion to the topic, respectively;

locating one or more search results for the revised query; and returning the one or more search results.

18. The method of claim 1 further comprising categorizing the query.

* * * * *